(12) United States Patent
Goodrich et al.

(10) Patent No.: US 12,152,198 B2
(45) Date of Patent: *Nov. 26, 2024

(54) MESOPHASE PITCH FOR CARBON FIBER PRODUCTION USING SUPERCRITICAL CARBON DIOXIDE

(71) Applicant: TerraPower, LLC, Bellevue, WA (US)

(72) Inventors: Benjamin L. Goodrich, Marysville, WA (US); Pyoungchung Kim, Bothell, WA (US); Matthew Targett, Bainbridge Island, WA (US); Joshua C. Walter, Kirkland, WA (US)

(73) Assignee: TerraPower, LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/446,298

(22) Filed: Aug. 8, 2023

(65) Prior Publication Data

US 2023/0383189 A1    Nov. 30, 2023

Related U.S. Application Data

(63) Continuation of application No. 17/874,832, filed on Jul. 27, 2022, now Pat. No. 11,725,146, which is a continuation of application No. 16/532,334, filed on Aug. 5, 2019, now Pat. No. 11,434,429.

(60) Provisional application No. 62/820,162, filed on Mar. 18, 2019.

(51) Int. Cl.
*C10C 3/08* (2006.01)
*C01B 32/05* (2017.01)
*D01F 9/15* (2006.01)

(52) U.S. Cl.
CPC .............. *C10C 3/08* (2013.01); *C01B 32/05* (2017.08); *D01F 9/15* (2013.01)

(58) Field of Classification Search
CPC .. C10C 3/08; C10C 1/18; C01B 32/05; D01F 9/15; D01D 1/02
See application file for complete search history.

(56) References Cited

U.S. PATENT DOCUMENTS 4,014,725 A    3/1977   Schulz
4,575,412 A    3/1986   Yudate et al.
(Continued)

FOREIGN PATENT DOCUMENTS

CN    105705612 A    6/2016
CN    104004536 B    1/2017
(Continued)

OTHER PUBLICATIONS

Demirbas et al., An Overview of Biomass Pyrolysis, Energy Sources, vol. 24, No. 5, 2002, pp. 471-482.
(Continued)

*Primary Examiner* — Cephia D Toomer
(74) *Attorney, Agent, or Firm* — Merchant and Gould, PC

(57) ABSTRACT

Embodiments of methods for improving mesophase pitch for carbon fiber production using supercritical carbon dioxide are described. The methods improve the relative amount and quality of mesophase pitch in feedstocks, such as coal tar, already having at least some mesophase pitch. One particular method includes performing a sCO2/toluene extraction on the coal tar to obtain a toluene insoluble fraction of the coal tar; mixing the toluene insoluble fraction with sCO2 to obtain a sCO2/toluene insoluble fraction mixture; and extruding the sCO2/toluene insoluble fraction mixture, thereby separating the sCO2 from the toluene insoluble fraction to obtain fibers of mesophase pitch.

20 Claims, 10 Drawing Sheets

(56) References Cited

U.S. PATENT DOCUMENTS

| | | | |
|---|---|---|---|
| 4,756,818 A | 7/1988 | Siegfried et al. | |
| 4,806,228 A | 2/1989 | Beneke et al. | |
| 4,902,492 A | 2/1990 | Beneke et al. | |
| 11,434,429 B2 * | 9/2022 | Goodrich | C10C 1/18 |
| 11,725,146 B2 * | 8/2023 | Goodrich | C10C 1/18 |
| | | | 423/447.1 |
| 2015/0136654 A1 | 5/2015 | Rende et al. | |
| 2015/0136660 A1 | 5/2015 | Bedard et al. | |
| 2018/0291275 A1 | 10/2018 | Goodrich et al. | |

FOREIGN PATENT DOCUMENTS

| | | |
|---|---|---|
| CN | 109399635 A | 3/2019 |
| EP | 0044761 B1 | 1/1982 |
| JP | 2001504752 A | 4/2001 |
| WO | WO2018/191378 A1 | 10/2018 |

OTHER PUBLICATIONS

Lisicki et al.: "Coal Tar Purification, Distribution and Characterization by Supercritical Extraction," Fuel Processing Technology, Elsevier BV, NL, vol. 20, Dec. 1, 1988 (Dec. 1, 1988), pp. 103-121, XP025683438, ISSN: 0378-3820, DOI: 10.1016/0378-3820 (8) 90012-4 [retrieved on Dec. 1, 1988] Summary Principles of SCF extraction processes Choice of solvent for SCF coal tar extraction.

PCT/US2020/023162—PCT International Search Report and Written Opinion in International Application PCT/ US2020/023162, mailed Jun. 9, 2020, 16 pages.

Westerhof, Roel J.M. et al., Effect of Temperature in Fluidized Bed Fast Pyrolysis of Biomass: Oil Quality Assessment in Test Units, Industrial & Engineering Chemistry Research, vol. 49, Issue 3, (2010), pp. 1160-1168.

* cited by examiner

MESOPHASE PITCH FOR CARBON FIBER PRODUCTION USING SUPERCRITICAL CARBON DIOXIDE

CROSS REFERENCE TO RELATED APPLICATIONS

The present application is a continuation of U.S. Non-Provisional patent application Ser. No. 17/874,832, titled "Improving Mesophase Pitch for Carbon Fiber Production Using Supercritical Carbon Dioxide" filed Jul. 27, 2022, and issued as U.S. Pat. No. 11,725,146 on Aug. 15, 2023, which is a continuation of U.S. Non-Provisional patent application Ser. No. 16/532,334, titled "Improving Mesophase Pitch for Carbon Fiber Production Using Supercritical Carbon Dioxide" filed Aug. 5, 2019, and issued as U.S. Pat. No. 11,434,429 on Sep. 6, 2022, which claims the benefit of U.S. Provisional Patent Application No. 62/820,162, titled "Improving Mesophase Pitch for Carbon Fiber Production Using Supercritical Carbon Dioxide" and filed Mar. 18, 2019, and each of the above applications is hereby incorporated by reference herein in its entirety.

INTRODUCTION

Pyrolysis refers to a thermochemical decomposition of organic material at elevated temperatures in the absence of oxygen. Depending on how a pyrolysis system is configured and operated, different pyrolysis products can be obtained. There are systems and methods for generating coal tar via the pyrolysis of coal using supercritical carbon dioxide. In some of those systems and methods, the resulting coal tar product includes at least some mesophase material which can be used to create mesophase pitch. Mesophase pitch refers to an anisotropic liquid crystalline phase of pitch characterized by pre-graphitic order, high density, and high softening temperature. Mesophase pitch can be used to make high performance carbon fiber.

Improving Mesophase Pitch for Carbon Fiber Production Using Supercritical Carbon Dioxide Embodiments of methods for improving mesophase pitch for carbon fiber production using supercritical carbon dioxide are described. The methods improve the relative amount and quality of mesophase pitch in feedstocks, such as coal tar, already having at least some mesophase pitch. One particular method includes performing a sCO2/toluene extraction on the coal tar to obtain a toluene insoluble fraction of the coal tar; mixing the toluene insoluble fraction with sCO2 to obtain a sCO2/toluene insoluble fraction mixture; and extruding the sCO2/toluene insoluble fraction mixture, thereby separating the sCO2 from the toluene insoluble fraction to obtain fibers of mesophase pitch.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

DETAILED DESCRIPTION

Before the systems and methods for preparing improved mesophase pitch for carbon fiber production using supercritical carbon dioxide are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. It must be noted that, as used in this specification, the singular forms "a," "an," and "the" include plural referents unless the context clearly dictates otherwise. Thus, for example, reference to "a lithium hydroxide" is not to be taken as quantitatively or source limiting, reference to "a step" may include multiple steps, reference to "producing" or "products" of a reaction should not be taken to be all of the products of a reaction, and reference to "reacting" may include reference to one or more of such reaction steps. As such, the step of reacting can include multiple or repeated reaction of similar materials to produce identified reaction products.

Pitch refers to a collection of hydrocarbons including polyaromatic hydrocarbons that can be manufactured from coal, wood and other organic material. Pitch is characterized by having high (>80% by weight) elemental carbon composition, high concentration of polycyclic aromatic hydrocarbons (PAHs), and a softening temperature, where the softening temperature can range from 100° C. to greater than 250° C. (measured using the Vicat method ASTM-D 1525). Generally, pitch suitable for carbon fiber will be capable of forming a high concentration of anisotropic mesophase pitch. It can be used as a base for coatings and paint, in roofing and paving, and as a binder in asphalt products. Pitch may also be used to create carbon fiber as discussed in greater detail below.

While the systems and methods below will be presented in terms of a supercritical carbon dioxide embodiment, any supercritical fluid may be used such as carbon dioxide, water, methane, nitrous oxide, ethane, propane, ethylene, propylene, methanol, ethanol, acetone, etc. or mixtures of supercritical fluids.

Figure 1:
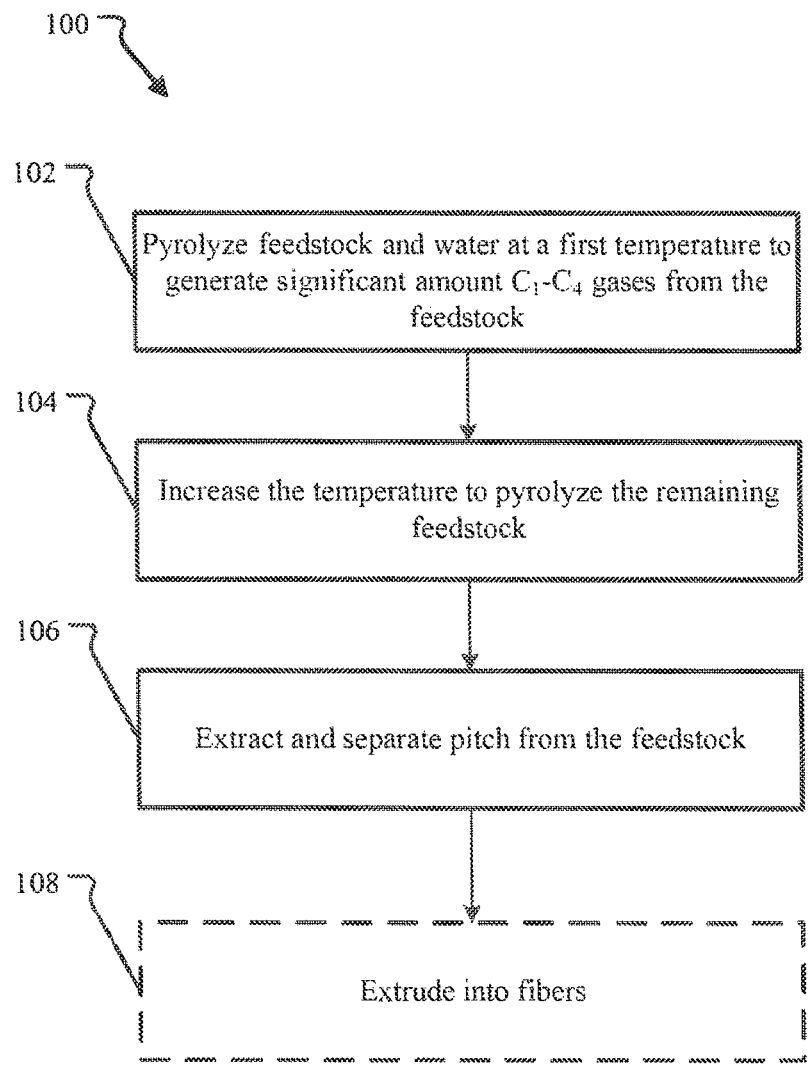
FIG. 1 illustrates, at a high-level, a simplified embodiment of a pyrolysis method that improves the relative amount of pitch produced from a given feedstock.

FIG. 1 illustrates, at a high-level, a simplified embodiment of a pyrolysis method that improves the relative amount of pitch produced from a given feedstock. In the method 100 shown, a carbonaceous feedstock material and water are subjected to a two-stage pyrolysis. The water may exist as moisture content within the feedstock. Alternatively, additional water may be added to the feedstock at some point before or during the pyrolysis.

The first stage is a low temperature pyrolysis operation 102 to remove $C_1$-$C_4$ gases from the feedstock. In this stage 102, the pyrolysis is performed at a lower temperature (e.g., 150-350° C. at from 7-30 MPa). The feedstock are heated to the first stage temperature and held at that temperature to generate and remove $C_1$-$C_4$ gases from the feedstock. In an embodiment, the gases in the pyrolysis reaction chamber are monitored and, when it is determined that the $C_1$-$C_4$ gas concentration has begun to level off based on the operator's criteria, a higher temperature pyrolysis operation 104 is performed.

The first stage temperature may be selected based on prior knowledge of the properties of the feedstock or may be automatically determined based on a real-time analysis of the pyrolysis reaction and the products being generated. Depending on the embodiment, the first stage temperature may have a lower range selected from 150° C., 175° C., 200° C., 225° C., 250° C., 275° C., 300° C. and 325° C. and may have an upper range selected from 175° C., 200° C., 225° C., 250° C., 275° C., 300° C., 325° C. and 350° C. so that any combination of the aforementioned lower ranges and upper ranges may be used.

In the second stage pyrolysis operation 104, the temperature is increased to from 350-550° C. at from 7-30 MPa, for example from 7-12 MPa, and held at that temperature for a period of time sufficient to generate pitch. As with the first stage, the amount of pyrolysis reaction products generated will level off over time as the system comes to equilibrium and the length of the second pyrolysis operation 104 is at the operator's discretion.

The second stage temperature may be selected based on prior knowledge of the properties of the feedstock or may be automatically determined based on a real-time analysis of the pyrolysis reaction and the products being generated. Depending on the embodiment, the second stage temperature may have a lower range selected from 350° C., 375° C., 400° C., 425° C. 450° C., and 480° C. and may have an upper range selected from 375° C., 400° C., 425° C., 450° C., 450° C., 480° C., 500° C., 525° C., and 550° C. so that any combination of the aforementioned lower ranges and upper ranges may be used.

The pitch is then obtained in an extraction and separation operation 106. In the extraction and separation operation 106 the pitch is extracted using a solvent, such as supercritical carbon dioxide ($sCO_2$), the solvent and dissolved pitch removed from the reaction chamber, and then separated to produce a pitch product.

In order to obtain carbon fiber from the pitch, an optional (illustrated by dashed lines in the drawing) extrusion operation 108 may be performed in which the pitch is extruded into fibers of a desired cross-sectional profile and allowed to cool. The pitch may or may not be washed first, e.g., by toluene or other solvent, to remove unwanted products and refine the pitch further.

Experimental data for two stage process of FIG. 1 indicates that the quantity of pitch produced for a given feedstock is greater than would otherwise be obtained from the same feedstock using a single stage pyrolysis at the higher temperature. Without being bound to any particular theory, the two stage process above appears to remove lighter hydrocarbons from the feedstock in the first stage, which makes them unavailable to react with the larger hydrocarbon chains and aromatics during the second stage and this improves the relative amount of pitch generated.

The feedstock material may include any carbonaceous material known in the art. For example, the feedstock material may include, but is not limited to, coal, biomass, mixed-source biomaterial, peat, tar, plastic, refuse, and landfill waste. For example, in the case of coal, the feedstock may include, but is not limited to, bituminous coal, sub-bituminous coal, lignite, anthracite and the like. By way of another example, in the case of biomass, the feedstock may include a wood material, such as, but not limited to, softwoods or hardwoods. In the detailed embodiments experiments discussed herein, the feedstock is presented as coal. However, it will be understood that pitch may be equally generated from any other type of feedstock material and then subsequently used to generate carbon fiber in the same manner as described with coal.

It should be noted that any carbonaceous feedstock such as coal may include some amount of water. In addition, water may be added to the feedstock prior to or during pyrolysis in any of the methods and systems discussed herein to modify the products created by the reaction. Likewise, feedstock may be dried prior to pyrolysis to lower the amount of water available during the pyrolysis operation and such a drying operation may be part of any of the methods and systems discussed herein.

Figure 2:
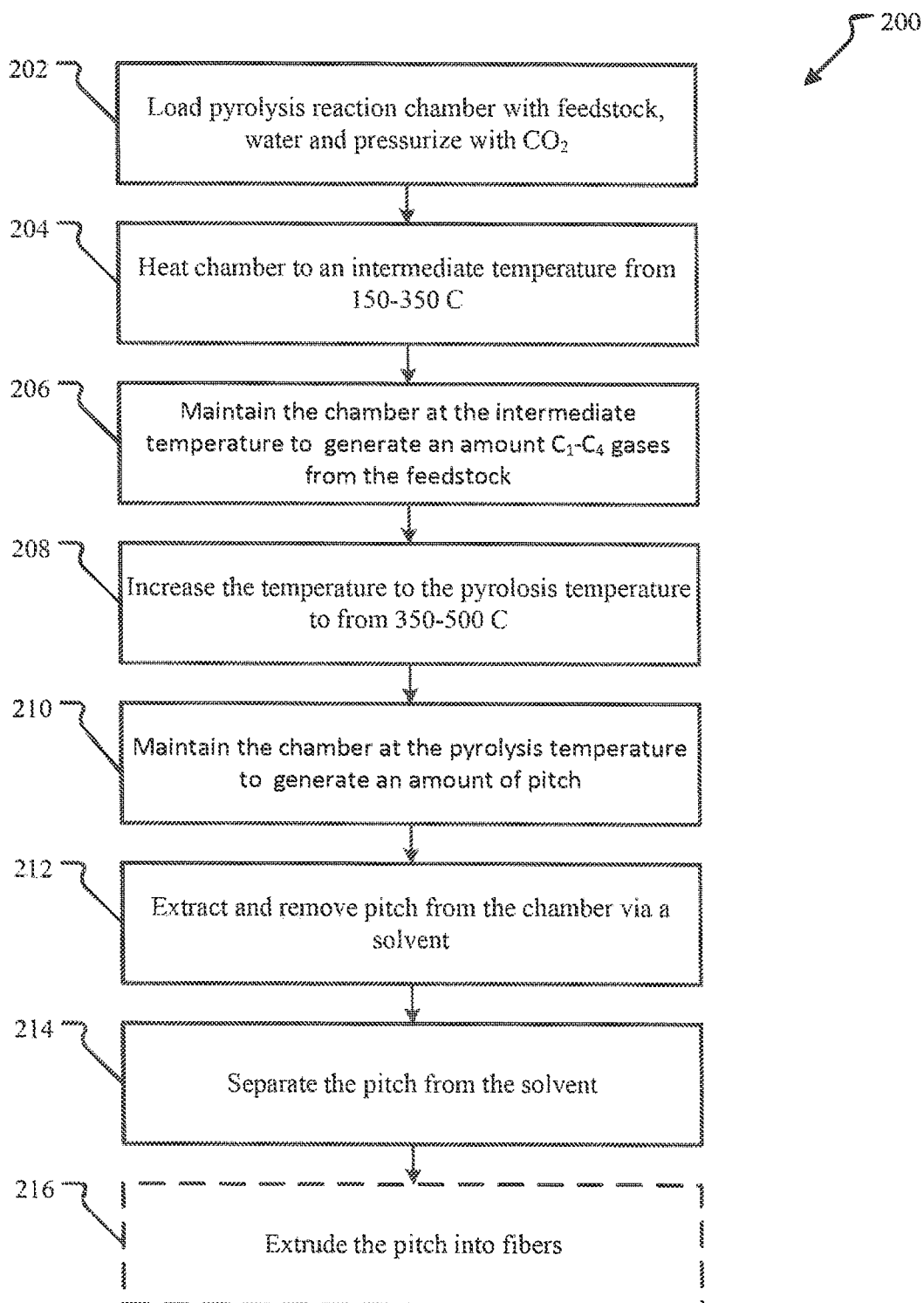
FIG. 2 illustrates a more detailed embodiment of the pyrolysis method of FIG. 1.

FIG. 2 illustrates a more detailed embodiment of the pyrolysis method of FIG. 1. The method 200 begins by placing the feedstock material and water in a pyrolysis reaction chamber in a loading operation 202. In an embodiment, the feedstock material and/or the water may be pre-heated before placement into the pyrolysis reaction chamber. The amount of water used may be from 1%-1000% the weight of the dried feedstock material. In an embodiment, the amount of water may be from 10%, 20%, 30%, 40%, or 50% the weight of dried feedstock material on the low end and up to 100%, 200%, or 500% on the high end. The water may be added separately or may already be in the feedstock material. For example, in an embodiment the feedstock material used is coal semi-saturated with water such that more than 10% of the weight of the feedstock material is water and the water in the coal is used as the water for the loading operation 202.

The loading operation may also include pressurizing the pyrolysis reaction chamber to the operating pressure (e.g., 7-12 MPa). In an embodiment, this may include removing oxygen and adding pressurized $CO_2$ to the reaction chamber. In this embodiment, the pressurized $CO_2$ may later be used as the solvent for extracting and removing the pitch and other soluble reaction products from the chamber.

The method 200 also includes heating pyrolysis reaction chamber to an intermediate temperature from 150 to 350° C. at from 7-12 MPa in an initial heating operation 204. A narrower temperature range may be used such as from 160, 170, 180, 190, 200, 210, 220, 230, or 240 at the lower end of the range and to 250, 260, 270, 280, 290, 300, 310, 320, 330, or 340 at the upper end of the range. The initial heating operation 204 may be performed before or after the loading operation 202. In an embodiment, the operation 204 may be performed to increase the temperature a fast as practicable with the given equipment so that the reactions at temperatures lower than the intermediate temperature are reduced.

The intermediate temperature is then maintained for a period of time in a first temperature hold operation 206. The hold time may be preselected such as for 10, 15, 30, 60, 120 or even 240 minutes. For example, the preselected hold time may be based on prior experiments. Alternatively, the hold time may be determined by monitoring the gases in the pyrolysis reaction chamber. For example, in an embodiment the concentration of one or more pyrolysis reaction product gases such as methane, ethane, butane, propane, or any other light gas reaction product is monitored. The concentration of the monitored gas or gases will rise initially and ultimately begin to level off roughly following an exponential curve. The hold time may be based on the monitored change in gas or gases concentration over time. For example, in an embodiment the first temperature hold operation 206 may be terminated when it is observed that the concentration of monitored gas or gases has increased by less than some threshold amount (e.g., 2% or 100 ppm) over some predetermined period (e.g., 10 seconds, 1 minute, 5 minutes, etc.). In yet another embodiment the amount of energy input into the chamber to maintain the pyrolysis temperature or any other parameter, such as visual or physical condition the feedstock material, may also be monitored to determine that the reaction has progressed to the operator's satisfaction.

A second heating operation 208 is then performed. In the second heating operation 208, the temperature of the pyrolysis chamber and the feedstock material is raised to a pyrolysis temperature from 300 to 550° C. For example, the second heating operation 208 may include heating the reaction chamber to from 325° C., 350° C., 375° C., or 400° C. on the low end of the range to from 425° C., 450° C., 475° C., 500° C., 525° C., or 550° C. on the high end.

The pyrolysis temperature, which may also be referred to as the pitch production temperature, is then maintained for a second period of time from 1 minute to 24 hours in a second temperature hold operation 210. Again, the second hold time may be preselected, for example based on prior experiments. Alternatively, the hold time may be determined by monitoring the one or more gases, which may or may be the same gas or gases monitored during the first temperature hold operation 206, in the pyrolysis reaction chamber. In yet another embodiment the amount of energy input into the chamber to maintain the pyrolysis temperature or any other parameter, such as visual or physical condition the feedstock material, may also be monitored to determine that the reaction has progressed to the operator's satisfaction.

At the end of the second hold time, the pitch may be extracted and removed from the pyrolysis chamber in an extraction operation 212.

A separation operation 214 may then be performed to separate the extracted pitch from the solvent. In an embodiment, if the solvent is $sCO_2$ the separation operation 214 may include removing the $sCO_2$ and dissolved pyrolysis reaction products from the chamber from the chamber and reducing the temperature and pressure of the solvent until the pitch is obtained. For example, the $sCO_2$ may be passed through successive collection chambers, each at a different pressure-temperature combination, in order to fractionally remove components of the reaction products, including the pitch, that have different solubilities in carbon dioxide. One of the separation chambers may be maintained at a temperature and pressure particular to the condensation of pitch from the solvent. For example, in an embodiment pitch is obtained from $CO_2$ solvent in a chamber maintained at 350° C. or greater in temperature and 7.39 MPa or greater in pressure.

In order to obtain carbon fiber from the pitch, an optional (illustrated by dashed lines in the drawing) extrusion operation 216 may be performed in which the pitch is extruded into fibers of a desired cross-sectional profile and allowed to cool. The pitch may or may not be washed first to remove unwanted products and refine the pitch further prior to or after extrusion. Additionally, the extruded pitch may be drawn, dried, cooled, baked, heat-treated (in oxidative or inert environments), or otherwise post-processed to improve the properties of the fiber strand.

The method 200 described above was described in terms of a batch process in a single pyrolysis reaction chamber. In an alternative embodiment the method may be performed as a continuous or semi-continuous process using one or more pyrolysis reaction chambers. For example, in an embodiment the initial heating operation 204 and first temperature hold operation 206 may be performed in a first reaction chamber and then the contents may be transferred to a second chamber for the second heating operation 208 and second temperature hold operation 210.

Figure 3:
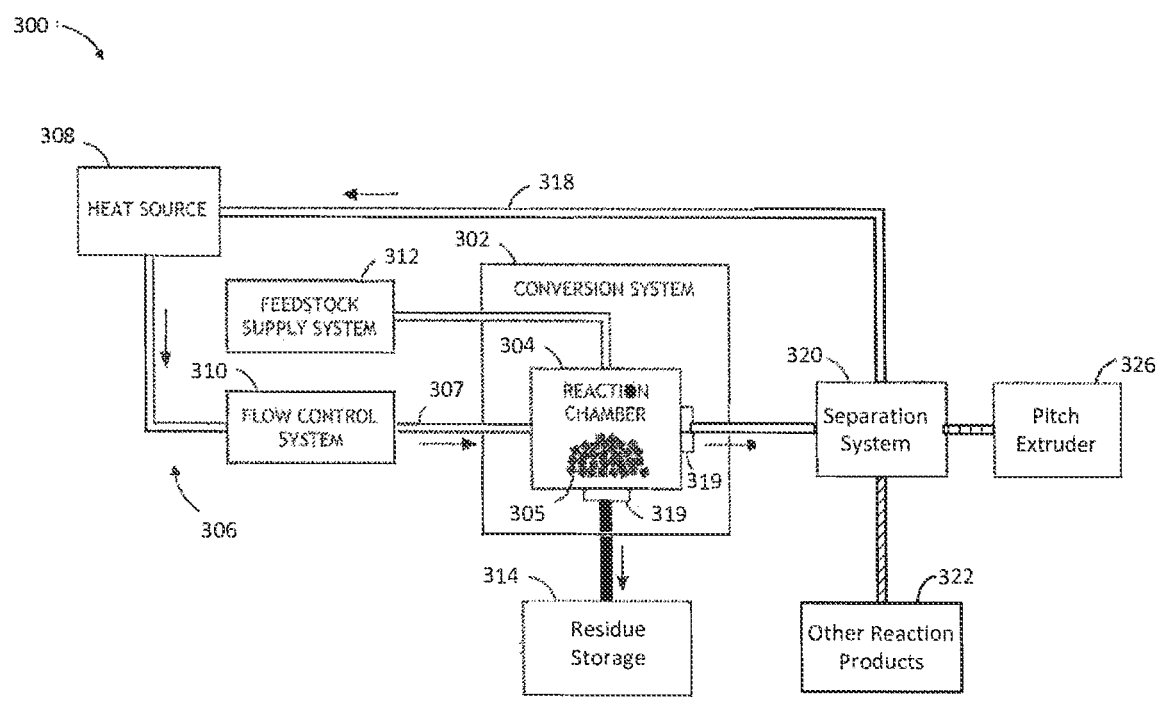
FIG. 3 is an example of a system suitable for the pitch production methods described above.

FIG. 3 is an example of a system 300 suitable for the pitch production methods described above. FIG. 3 illustrates a block diagram view of a system 300 for converting carbonaceous material to one or more reaction products. In one embodiment, the system 300 includes a thermochemical conversion system 302. In one embodiment, the thermochemical conversion system 302 includes a thermochemical reaction chamber 304, such as a pyrolysis reaction chamber, suitable for containing a volume of feedstock material and water 305 (e.g., carbonaceous material) and converting the feedstock material to one or more reaction products including pitch.

In the embodiment shown, the system 300 includes one or more heat sources 308 and a thermal energy transfer system 306 for transferring thermal energy from the one or more heat sources 308 to the volume of feedstock 305 contained within the thermochemical reaction chamber 304. The thermal energy transfer system 306 includes a heat transfer element 307. For example, the heat transfer element 307 may include, but is not limited to, a heat transfer loop, a heat transfer line and the like. For instance, the heat transfer element 307 may include, but is not limited to, a heat transfer loop filled with a supercritical fluid (e.g., $sCO_2$) placed in thermal communication (e.g., directly or indirectly) with one or more portions of the one or more heat sources 308.

In one embodiment, the thermal energy transfer system is arranged to selectably place the volume of the supercritical fluid in thermal communication with the volume of feedstock contained within the thermochemical reaction chamber. In this regard, the thermal energy transfer system 306 may selectably transfer thermal energy from the one or more heat sources 308 to the volume of feedstock 305 contained within the at least one thermochemical reaction chamber 304. In another embodiment, the thermochemical reaction chamber 304 may pyrolyze least a portion of the feedstock 305 to obtain one or more reaction products using the thermal energy carried to the feedstock via the supercritical fluid.

The supercritical fluid of system 300 may include any supercritical fluid known in the art suitable for transferring energy from the one or more heat sources 308 to the feedstock 305 contained in the thermochemical reaction chamber 304. In one embodiment, the supercritical fluid includes, but is not limited to, $sCO_2$. In another embodiment, the supercritical fluid includes, but is not limited to, water, methanol, ethanol, propanol, acetone. In another embodiment, the supercritical fluid is pressurized to high pressure within at least one of the heat transfer element 307 and the thermochemical reaction chamber 304.

It is noted herein that the supercritical fluid of system 300, such as, but not limited to $CO_2$, may have low viscosity and surface tension, allowing such supercritical fluids to readily penetrate organic materials (e.g., coal). The penetration of the supercritical fluid into the feedstock 305 reduces the need for converting the feedstock 305 into fine particles prior to thermochemical reaction, thereby saving energy in the preparation of the feedstock material. In one embodiment, in case where the supercritical fluid is supercritical $CO_2$, the supercritical fluid may be pressurized to above its critical pressure (7.39 MPa) and critical temperature (31° C.). It is noted herein that above these conditions, $CO_2$, will display unique solvency properties, similar to organic solvents such as hexane, heptane, benzene, and toluene. The non-polar nature of supercritical $CO_2$ may facilitate the control of undesirable ionic secondary reactions that commonly occur in aqueous environments. Further, $CO_2$ will volatize when the system is depressurized below the critical conditions, which facilitates the recovery of oil with low content of water. Again, this may significantly reduce energy consumption during reaction product-supercritical fluid separation, described further herein, following pyrolysis. It is further noted herein that the supercritical fluid of system 300 applies heated and pressurized $CO_2$ to the feedstock material 305, which provides for better control of reaction conditions (e.g., time, pressure, and temperature), thereby allowing for better selectivity of high-value targeted chemical compounds or fuel intermediates.

In another embodiment, a supercritical fluid, such as supercritical $CO_2$, may provide strong temperature and reaction time control via the injection of cooler supercritical fluid into the thermochemical reaction chamber 304 to quench the reaction or hotter supercritical fluid to accelerate the reaction. It is further recognized that since a number of supercritical fluids, such as supercritical $CO_2$, can be efficiently compressed, pressure conditions within the thermochemical reaction chamber 304 may also be used to control thermochemical reactions within the thermochemical reaction chamber 304.

In another embodiment, the solubility of one or more reaction products, such as pitch, in the supercritical fluid may be controlled by adding or removing a polar material into the supercritical fluid. For example, the solubility of one or more oils in supercritical carbon dioxide may be controlled by the addition/removal of one or more materials including a polar molecule, such as, but not limited to, $H_2O$, ethanol, methanol, higher alcohols, and the like. By way of another example, in the case where the feedstock material includes coal, the solubility of one or more oils in $sCO_2$ may be controlled by adding/removing one or more materials including a hydrogen donor molecule, such as, but is not limited to, $H_2$, $H_2O$, formic acid, tetralin, and any other hydrogen donor solvents known in the art.

It is recognized herein that feedstock 305 contained within the thermochemical reaction chamber 304 may include sufficient moisture and polar nature to adequately dissolve the one or more reaction products (e.g., bio-oil) in the supercritical fluid. As discussed further herein, the 'dryness' of the feedstock may be controlled by the thermochemical conversion system 302 (e.g., controlled via dryer 134), allowing the thermochemical conversion system 302 to maintain a moisture content level within the feedstock 305 to a level sufficient for adequately dissolving one or more reaction products in the supercritical fluid.

In another embodiment, the supercritical fluid may contain one or more materials for enhancing one or more physical or thermochemical reactions in the system 300. For example, the supercritical fluid may contain one or more catalysts, such as, but not limited to, metals, metal salts and organics. By way of another example, the supercritical fluid may contain one or more solutes, such as, but not limited to, alcohols, oils, hydrogen and hydrocarbons.

The one or more heat sources 308 may include any heat source known in the art suitable for providing thermal energy sufficient to heat the feedstock 305 to the selected temperatures used in the two stages of pyrolysis.

In one embodiment, the one or more heat sources 308 include a non-$CO_2$ emitting heat source. In one embodiment, the one or more heat sources 308 include one or more nuclear reactors. The one or more heat sources 308 may include any nuclear reactor known in the art. For example, the one or more heat sources 308 may include a liquid metal cooled nuclear reactor, a molten salt cooled nuclear reactor, a high temperature water cooled nuclear reactor, a gas cooled nuclear reactor and the like. By way of another example, the one or more heat sources 308 may include a pool reactor. By way of another example, the one or more heat sources 308 may include a modular reactor.

It is recognized herein that a nuclear reactor may generate temperatures sufficient to carry out pyrolysis (e.g., fast pyrolysis) of feedstock 305. For example, a nuclear reactor heat source may generate temperatures in excess of 350-600° C. In this regard, a nuclear reactor may be used to transfer thermal energy (e.g., at a temperature in excess of 350-600° C.) to the supercritical fluid. In turn, the supercritical fluid may transfer the nuclear reactor generated thermal energy to the feedstock 305 contained within the thermochemical reaction chamber 304.

It is further noted herein that a nuclear reactor heat source may be particularly advantageous as a heat source in the context of system 300 because the thermochemical reaction temperatures of system 300 are within the range of operating temperatures for many nuclear reactors. Nuclear reactor heat may be used to create reaction products (e.g., pitch) in the thermochemical reaction chamber 304 at high efficiency since the nuclear reactor is operating at the reaction temperature for the thermochemical conversion (i.e., heat added at the thermochemical reaction temperature supplies the required reaction enthalpy).

In one embodiment, as shown in FIG. 3, the thermal energy transfer system 306 includes a direct heat exchange system configured to transfer thermal energy directly from the one or more heat sources 308 to the volume of the supercritical fluid of the heat transfer element 307. For example, the heat transfer element 307 may be placed in direct thermal communication with a portion of the one or more heat sources 308. For instance, in the case where the one or more heat sources 308 include a nuclear reactor, one or more coolant systems of the nuclear reactor may be integrated with the thermal energy transfer system 306. In this regard, the nuclear reactor may utilize a supercritical fluid in one or more coolant systems, which may then be coupled directly to the thermochemical reaction chamber 304. For example, a primary or intermediate coolant loop of the nuclear reactor may include a coolant fluid consisting of a supercritical fluid, such as supercritical $CO_2$. Further, the coolant loop of the nuclear reactor may be directly coupled to the thermochemical reaction chamber 304 via the thermal energy transfer system 306 so as to intermix the supercritical fluid of the coolant loop of the nuclear reactor with the feedstock material 305 contained within the thermochemical reaction chamber 304. In turn, upon transferring thermal energy from the nuclear reactor to the feedstock material 305, the thermal energy transfer system 306 may circulate the supercritical fluid coolant back to the nuclear reactor via return path 318. It is further contemplated herein that the thermal energy transfer system 306 may include any number of filtration elements in order to avoid transfer of feedstock and/or reaction products to the coolant system(s) of the nuclear reactor.

In another embodiment, not shown, the thermal energy transfer system 306 includes an indirect heat exchange system. In one embodiment, the indirect heat exchange system is configured to indirectly transfer thermal energy from the one or more heat sources 308 to the volume of the supercritical fluid contained within the heat transfer element 307. In one embodiment, the indirect heat exchange system includes an intermediate heat transfer element (not shown) configured to transfer thermal energy from the one or more heat source 308 to the intermediate heat transfer element. In turn, the intermediate heat transfer element may transfer thermal energy from the intermediate heat transfer element to the volume of the supercritical fluid contained within the heat transfer element 307.

In an embodiment, the intermediate heat transfer element may include an intermediate heat transfer loop and one or more heat exchangers. The intermediate heat transfer loop may include any working fluid known in the art suitable for transferring thermal energy. For example, the working fluid of the intermediate heat transfer loop may include, but is not limited to, a liquid salt, a liquid metal, a gas, a supercritical fluid (e.g., supercritical $CO_2$) or water.

Further, as described previously herein, the heat transfer element 307 of the heat transfer system 306 may intermix the supercritical fluid contained within the heat transfer element 307 with the feedstock material 305 contained within the thermochemical reaction chamber 304. In turn, upon transferring thermal energy from the heat source 308 to the feedstock material 305 via the heat transfer element 307, the thermal energy transfer system 306 may re-circulate the supercritical fluid coolant via return path 318.

It is noted herein that the above description of the direct and indirect coupling between the one or more heat sources 308 and the feedstock 305 is not limiting and is provided merely for illustrative purposes. It is recognized herein that in a general sense the integration between the one or more heat sources (e.g., nuclear reactor) and the thermochemical reaction chamber 304 may occur by transferring heat from a primary, intermediate, or ternary heat transfer system (e.g., coolant system) of the one or more heat sources 308 to the working fluid, such as supercritical $CO_2$, of the thermochemical conversion system 302. It is further recognized herein that this integration may be carried out using any heat transfer systems or devices known in the art, such as, but not limited to, one or more heat transfer circuits, one or more heat sinks, one or more heat exchangers and the like.

In one embodiment, the thermal energy transfer system 306 includes a flow control system 310. The flow control system 310 may be arranged to selectably place the supercritical fluid in thermal communication with the volume of feedstock contained within the thermochemical reaction chamber 304. In this regard, the flow control system 310 may selectably transfer thermal energy from the one or more heat sources 308 to the volume of feedstock contained within thermochemical reaction chamber 304. For example, the flow control system 310 may be positioned along the heat transfer element 307 (e.g., heat transfer loop) in order to control the flow of supercritical fluid through the heat transfer element 307. In this regard, the flow control system 310 may control the flow of the supercritical fluid to the volume of feedstock 305, thereby controlling the transfer of thermal energy to the feedstock 305.

The flow control system 310 may include any flow control system known in the art suitable for controlling supercritical fluid flow from a first position to a second position. For example, the flow control system 310 may include, but is not limited to, to one or more control valves operably coupled to the heat transfer element 307 and suitable for establishing and stopping flow through the heat transfer element 307. For instance, the flow control system 310 may include a manually controlled valve, a valve/valve actuator and the like.

In another embodiment, the flow control system 310 may couple the thermal energy from the one or more heat sources 308 to an electrical generation system (not shown). For example, the flow control system 310 may establish a parallel coupling of heat source 308 generated heat to a turbine electric system and the thermochemical conversion system 302. In one embodiment, the thermochemical conversion system 302 may include multiple batch-type reaction systems, which may receive heat from the one or more heat sources 308 (e.g., nuclear reactor). In this manner, it is possible to run multiple batch processes, concurrently or sequentially, which address overall thermal and feedstock conversion needs. In another embodiment, heat may be transferred to one or more continuous thermochemical reactors while being coupled in parallel to one or more turbine electric system.

In one embodiment, the system 300 includes a feedstock supply system 312. In one embodiment, the feedstock supply system 312 is operably coupled to the thermochemical reaction chamber 304 of the thermochemical conversion system 302. In another embodiment, the feedstock supply system 312 provides a volume of feedstock material and water 305 to the interior of the thermochemical reaction chamber 304. The feedstock supply system 312 may include any supply system known in the art suitable for transferring a selected amount of feedstock material, such as solid material, particulate material or liquid material, from one or more feedstock sources to the interior of the thermochemical reaction chamber 304. For example, the feedstock supply system 312 may include, but not limited, to a conveyor system, a fluid transfer system and the like.

The feedstock supply system 312 may include separate systems for transferring the feedstock and transferring additional water in the amount necessary for the desired reaction. In an alternative embodiment, water may be added to the feedstock prior to the transfer of the feedstock into the reaction chamber 304. This may be done in the feedstock supply system 312 or prior to receipt by the feedstock supply system 312.

A moisture control system (not shown) may be provided to determine the moisture of the feedstock and add water if necessary. Such a system may include a moisture detector that continuously or periodically determines the moisture of the feedstock, compares the moisture to a target water content range and adds water if the moisture is below the target range. A dryer may also be provided in case the moisture is above the target range for drying the feedstock material 305.

The feedstock material 305 may include any carbonaceous material known in the art. For example, the feedstock material 305 may include, but is not limited to, coal, biomass, mixed-source biomaterial, peat, tar, plastic, refuse, and landfill waste. For example, in the case of coal, the feedstock may include, but is not limited to, bituminous coal, sub-bituminous coal, lignite, anthracite and the like. By way of another example, in the case of biomass, the feedstock may include a wood material, such as, but not limited to, softwoods or hardwoods.

It is noted herein that the ability to control temperature, pressure, reaction time, pre-treatment options, and post organic-product production options may allow for multiple types of carbonaceous feedstock to be utilized within the system 300. In addition, the ability to co-utilize or switch between types of feedstock may improve the utilization of available resources and improve the overall pitch production economics.

Referring again to FIG. 3, the thermochemical conversion system 302 includes any thermochemical reaction chamber 304 suitable for carrying out pyrolysis. In one embodiment, the thermochemical reaction chamber 304 is configured to carry out a pyrolysis reaction on the feedstock 305. In another embodiment, the thermochemical reaction chamber 304 includes a pyrolysis chamber. In another embodiment, the thermochemical reaction chamber 304 includes a non-combustion or low-combustion pyrolysis chamber. The pyrolysis chamber of system 300 may encompass any thermochemical reaction chamber suitable for carrying out the thermochemical decomposition of organic molecules in the absence of oxygen or in a low oxygen environment.

In one embodiment, the thermochemical reaction chamber 304 includes a fast pyrolysis reactor suitable for converting feedstock 305, such as coal, to reaction products including pitch. A fast pyrolysis reactor may include any thermochemical reaction chamber capable of carrying out a thermochemical decomposition of organic molecules in the absence of oxygen (or in a reduced oxygen environment) within approximately two seconds. Fast pyrolysis is generally described by Roel J. M. Westerhof et al. in "Effect of Temperature in Fluidized Bed Fast Pyrolysis of Biomass: Oil Quality Assessment in Test Units," Industrial & Engineering Chemistry Research, Volume 49 Issue 3 (2010), pp. 1160-1168, which is incorporated herein by reference in the entirety. Pyrolysis and fast pyrolysis are also generally described by Ayhan Demirbas et al. in "An Overview of Biomass Pyrolysis," Energy Sources, Volume 24 Issue 3 (2002), pp. 471-482, which is incorporated herein by reference in the entirety.

In another embodiment, the thermochemical reaction chamber 304 includes a supercritical pyrolysis reactor suitable for converting feedstock 305, such as coal or biomass, to a reaction product, such as pitch. For the purposes of the present disclosure, a 'supercritical pyrolysis reactor' is interpreted to encompass any reactor, reaction vessel or reaction chamber suitable for carrying out a pyrolysis reaction of feedstock material using the thermal energy supplied from a supercritical fluid. In another embodiment, the thermochemical reaction chamber 304 may include, but is not limited to, a fluidized bed reactor.

In another embodiment, the thermochemical reaction chamber 304 may carry out one or more extraction processes on the feedstock. In another embodiment, an extraction chamber operably coupled to the thermochemical reaction chamber 304 may carry out one or more extraction processes on the feedstock after either of the first or second stage of pyrolysis. In one embodiment, the thermochemical reaction chamber 304 is configured to remove additional compounds from the feedstock material prior to pyrolysis. For example, the thermochemical reaction chamber 304 may be configured to remove at least one of oils and lipids, sugars, or other oxygenated compounds. In another embodiment, the extracted compounds may be collected and stored for the development of additional bio-derived products.

It may be advantageous to remove sugars from the feedstock material 305. It is recognized herein that sugars caramelize at elevated temperature and may act to block the supercritical fluid, such as supercritical $CO_2$, from entering the cellulose structure of the feedstock material 305. In addition, sugars present in the thermochemical conversion system 302 may also act to harm downstream catalyst beds (if any). It is noted herein that the removal of sugars aids in avoiding the formation of oxygenated compounds such as, but not limited to, furfural, hydroxymethalfurfural, vanillin and the like.

In one embodiment, the thermochemical conversion system 302 may extract materials from the feedstock 305 at temperatures below 200° C. It is noted herein that it is beneficial to extract sugars at temperatures below 200° C. as fructose, sucrose and maltose each caramelize at temperatures below approximately 180° C. In this regard, the supercritical fluid, through the deconstruction of cellulosic material and the sweeping away of sugars, may serve to extract sugars from the feedstock 305 prior to the elevation of temperatures during pyrolysis.

In another embodiment, the thermochemical reaction chamber 304 is configured to pre-heat the feedstock 305 prior to thermal decomposition. In another embodiment, a pre-heating chamber operably coupled to the thermochemical reaction chamber 304 is configured to pre-heat the feedstock 305 prior to thermal decomposition. For example, the thermochemical reaction chamber 304 (or the pre-heating chamber) may pre-heat the feedstock material to a temperature at or near the temperature necessary for liquefaction and/or pyrolysis.

In another embodiment, the thermochemical reaction chamber 304 is configured to pre-treat the feedstock 305 prior to thermal decomposition. For example, the thermochemical reaction chamber 304 may pre-hydrotreat the feedstock material with hydrogen prior to liquefaction and/or pyrolysis. For instance, pre-treating the feedstock material with hydrogen may aid in removing materials such as, but not limited to, sulfur, as well as serving to donate hydrogen to reactive species (i.e., stabilizing free radicals).

In an alternative embodiment, not shown, the thermochemical conversion system 302 is separated into multiple process chambers for carrying out the various steps of the multi-stage thermochemical process of system 300. For example, in one embodiment, a first chamber is provided for the first stage of pyrolysis at the intermediate temperature, a second stage is provided for the second stage of pyrolysis at the pyrolysis temperature and an extraction chamber is provided for solvent contacting and extracting the solvent with the desired pitch product. The feedstock 305 may be transferred between the chambers continuously or as a batch process.

Applicants note that while the above description points out that in some embodiments the pyrolysis reaction chambers and extraction chamber may exist as separate chambers, this should not be interpreted as a limitation. Rather, it is contemplated herein that two or more of the thermochemical steps may each be carried out in a single reaction chamber.

In one embodiment, the thermochemical reaction chamber 304 includes a multi-stage single thermochemical reaction chamber. In one embodiment, the thermochemical conversion system 306 is configured to transfer multiple portions of the supercritical fluid across multiple temperature ranges to the volume of feedstock 305 contained within the multi-stage single thermochemical reaction chamber 304 to perform a set of thermochemical reaction processes on the at least a portion of the volume of feedstock.

In another embodiment, the thermal energy transfer system 306 is configured to transfer a first portion of the supercritical fluid in a second temperature range to the volume of feedstock 305 contained within the single thermochemical reaction chamber 304 to perform a pre-heating process on at least a portion of the volume of feedstock.

In another embodiment, the thermal energy transfer system 306 is configured to transfer a second portion of the supercritical fluid in a first temperature range to the volume of feedstock 305 contained within the single thermochemical reaction chamber 304 to perform the first stage of pyrolysis on at least a portion of the volume of feedstock.

In another embodiment, the thermal energy transfer system 306 is configured to transfer a third portion of the supercritical fluid in a second temperature range to the volume of feedstock 305 contained within the single thermochemical reaction chamber 304 to perform the second stage of pyrolysis on at least a portion of the volume of feedstock.

In one embodiment, the flow and temperature of the supercritical fluid are varied spatially across the thermochemical reaction chamber 304. For example, in order to vary flow and/or temperature across the reaction chamber 304, multiple flows of supercritical fluid, each at a different temperature, may be established prior to entering the single reaction chamber. In this regard, in a vertical reaction chamber, the flow rate and temperature at a number of spatial locations, corresponding to the various thermochemical stages, may be varied. By way of another example, the temperature of the supercritical fluid may be varied along the length of the thermochemical reaction chamber 304 by flowing the supercritical fluid along the length of the thermochemical reaction chamber 304. For instance, a flow of low temperature supercritical $CO_2$ may be combined with a flow of $CO_2$ at a higher temperature (e.g., between 70 to 150° C.) to dissolve sugars. At another point downstream (e.g., 1-3 meters downstream with an average flow rate of 0.25-4 m/s), supercritical $CO_2$ at or above pyrolysis temperatures is mixed into the chamber. By staging the temperatures of the various thermochemical reaction steps according to length, the flow rate may be used to control reaction times.

It is further contemplated that two or more thermochemical steps, such as pyrolysis, extraction and separation, are carried out in the thermochemical chamber 304, while additional steps, such as drying and pre-heating are carried out in a dedicated chamber operably coupled to the thermochemical reaction chamber 304.

Reaction chambers may include one or more outlets 319, in accordance with one or more embodiments of system 300. In the embodiment shown in FIG. 3, the reaction chamber 304 is provided with an outlet for removing the feedstock residue remaining after the second stage of pyrolysis and another outlet for removing the solvent laden with the pitch and other dissolved pyrolysis products. In one embodiment, the outlet for the feedstock residue remaining after the second stage of pyrolysis is complete is arranged to remove the residue and transfer it to a residue storage system 314. In an embodiment, the residue storage system 314 may be as simple as a drum, railcar, Conex box or other portable container. In an alternative embodiment, the residue may be stored in piles for later transport.

The solvent outlet 319 transfers the solvent, in this embodiment the $sCO_2$, to a separation system 320. In an embodiment, the outlet includes a valve that controls the flow of gas from the reaction chamber 304 to the separation system 320.

In an embodiment, the separation system 320 in successive steps reduces the temperature and/or pressure to obtain different dissolved components. For example, optionally a heat rejection heat exchanger could be used before or after the separation system 320. In one of these steps, the pitch is condensed and transferred to a pitch extruder 326. The pitch may be stored intermediately in a holding container. Alternatively, the pitch may be immediately passed to the extruder 326 upon condensing out of the $sCO_2$.

In an embodiment, each step corresponds to a collection chamber maintained at a different condition of temperature and pressure in which dissolved products are allowed to condense from the solvent. Each chamber, then, collects those products that condense at the temperature and pressure of that chamber. In an embodiment, pitch is obtained from a chamber maintained at 350° C. or greater in temperature and 7.39 MPa or greater in pressure.

The pitch extruder, as discussed above, extrudes the pitch into fibers which are then allowed to cool for use directly or indirectly as carbon fiber.

Other compounds in the solvent stream removed from the reaction chamber 304 are collected for further treatment or sale in a product collection system 322. In one embodiment, a volatile gas separator and storage system may be provided as part of the product collection system 322 or the separation system 320. The volatile gas separator may separate one or more volatile gases from the remainder of the one or more reaction products. For example, the volatile gas separator may separate volatile gases such as, but not limited to, $CH_4$, $C_2H_4$, $C_2H_6$, CO, $CO_2$, $H_2$, and/or $H_2O$ from the solid or liquid reaction products. It is noted herein that the volatile gas separator may include any volatile gas separation device or process known in the art. It is further recognized that these gases may be cooled, cleaned, collected and stored for future utilization. Volatile gases may be produced in order to provide a hydrogen source.

In the embodiment shown, the $CO_2$ is returned 318 to the heat source 308 for reuse after the dissolved products are removed in a closed loop system. In an alternative embodiment the $CO_2$ is simply vented.

In another embodiment, not shown, the system 300 includes a heat recovery system. In the case of recovery, the system may recover heat from the $sCO_2$ prior to or as part of the separation system 320 (or any other appropriate sub-system of system 300) via a heat transfer loop acting to thermally couple the $sCO_2$ and the heat recovery system. In one embodiment, the recovered heat may serve as a recuperator or regenerator. In another embodiment, energy may be recovered following the thermochemical process carried out by chamber 304. In another embodiment, the recovered energy may be used to pre-heat feedstock material prior to thermochemical processing. In another embodiment, the recovered energy may be used to produce ancillary power (e.g., mechanical power or electrical power) to one or more sub-systems of the system 300.

Figure 4:
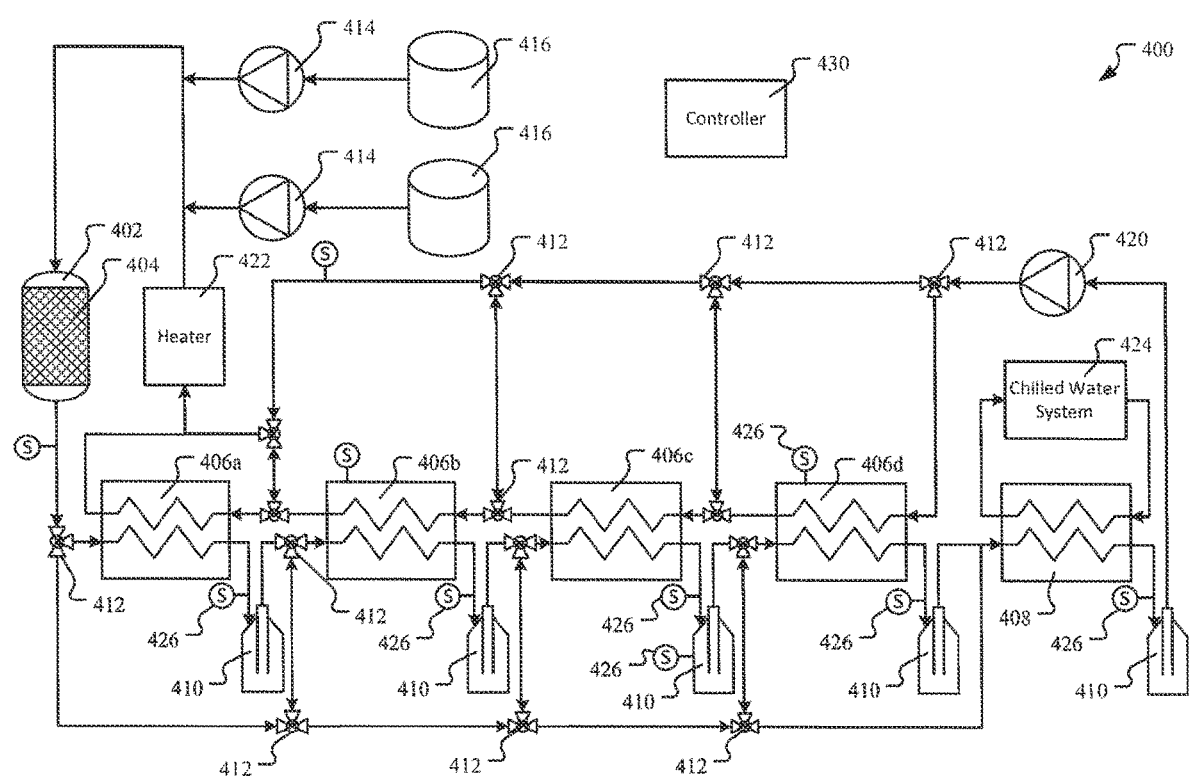
FIG. 4 illustrates a process flow diagram for a batch embodiment of flexible pyrolysis system that can be tuned to change the pyrolysis products obtained from a given feedstock.

FIG. 4 illustrates a process flow diagram for a batch embodiment of flexible pyrolysis system that can be tuned to change the pyrolysis products obtained from a given feedstock. In the embodiment shown, the feedstock will be presented as coal. However, the reader will understand that any carbonaceous feedstock may be used such as biomass.

FIG. 4 illustrates a closed-loop $CO_2$ pyrolysis system similar in operation to those described above. In the embodiment shown in FIG. 4, the pyrolysis chamber is a column 402 filled with coal 404. An inlet stream of supercritical fluid such as $sCO_2$ enters the top of the column and flows through the coal 404. By controlling the flow rate of $sCO_2$, the residence or contact time of the $sCO_2$ with the coal may be controlled as is known in the art in order to control the amount of dissolved reaction products in the $sCO_2$ observed in the outlet stream of the chamber. In an embodiment, the $sCO_2$ entering the pyrolysis chamber 402 can range in temperature from 300-600° C. and in pressure from 7.39-12 MPa so that the pyrolysis occurs with the $CO_2$ atmosphere in a supercritical state. Higher temperatures and pressures may also be used.

In a batch system, the pyrolysis chamber may be a simple cylindrical chamber without any internal components other than a screen to maintain the coal in place. Multiple chambers may be provided in parallel so that one may be in use while the char is removed from the others and they are recharged with new coal. In an alternative embodiment, the chamber may be provided with agitators or screws for moving the coal during the pyrolysis.

After contacting and pyrolyzing the coal 404, $sCO_2$ exits the bottom of the column 402 with dissolved pyrolysis products as described above. The output $sCO_2$ is then passed through a recuperating and condensing circuit that removes the dissolved pyrolysis products and then recuperates the $CO_2$ for reuse in the pyrolysis chamber 402. The recuperating and condensing circuit includes a series one or more recuperators 406 that simultaneously cool the $CO_2$ stream output by the pyrolysis chamber 402 while preheating the inlet/return stream of $CO_2$ (in which the products have mostly been condensed out of the stream) delivered to the chamber 402. In the system 400 shown, four recuperators 406 are illustrated, a first stage recuperator 406a, a second stage 406b, a third stage 406c and a fourth stage 406d. More or fewer recuperators 406 may be used as desired, as described below.

The recuperators 406 may be any type of heat exchanger now know or later developed. In an embodiment, for example, the recuperators 406 are each tube-in-tube heat exchangers with the output $CO_2$ in the outer tube and the cooler, inlet $CO_2$ stream flowing through the inner tube. However, any type of heat exchanger may be used in any configuration determined to be beneficial or desired.

In addition to the recuperators 406, an optional final cooling heat exchanger 408 stage may be provided as part of the recuperating and condensing circuit to perform the final reduction of temperature of the $CO_2$ to the desired low temperature of the circuit. This is achieved using a coolant, such as chilled water from a chilled water system 424 as shown, to perform the final cooling of the output stream. As with the recuperators 406, the final heat exchanger 408 if utilized may be any type of heat exchanger.

As mentioned above, the supercritical conditions for $CO_2$ are a temperature above 31.1° C. and pressures above 7.39 MPa. In describing the system, $CO_2$ will be referred to as supercritical even though at some points in the system the conditions may fall below the critical point in either temperature or pressure. In those points, it should be understood that the $CO_2$ may be in a gas or liquid state depending on the temperature and pressure conditions. Such states may occur, for example, downstream of the pyrolyzer 402 such as in the fourth recuperator 406 or the final heat exchanger 408.

For example, in an embodiment the low $sCO_2$ circuit temperature may be less than ° C. such as room temperature (20° C.) and the low pressure may be from 6-8 MPa. Lower temperatures and pressures may also be used. In this embodiment, the $CO_2$ is allowed to go subcritical in order to remove as much of the pyrolysis products as possible. In an alternative embodiment, the circuit temperatures and pressures are maintained so that the $CO_2$ remains in a supercritical state throughout the system 400.

In the embodiment shown, after each heat exchanger in the circuit, there is a condensation collection vessel 410. Each vessel is at a subsequently lower temperature, from left to right. The condensation vessel 410 may be any type of active or passive condensing apparatus. For example, in the embodiment shown the condensation vessel 410 is a cold finger condenser that provides a temperature-controlled surface over which the $CO_2$ flows. This causes any pyrolysis products condensable at or above the controlled temperature to collect in the condensation vessel 410. In an alternative embodiment, instead of a cold finger condenser a cyclone separator may be used. Other possible condensation vessels include Liebig condensers, Graham condensers, coil condensers, and Allihn condensers, to name but a few.

Where appropriate, the term 'process stream' will be used to refer to the $CO_2$ stream in the portion of the $CO_2$ circuit with $CO_2$ flowing from the pyrolysis chamber 402 through the last condensation collection vessel 410, while 'return stream' or 'inlet/return stream' will be used to refer to the $CO_2$ stream flowing through the circuit from the last condensation vessel, through the pump 420 and, ultimately, back into the pyrolysis chamber 402. Note that the return stream may not be completely pure $CO_2$ but will likely contain at least trace amounts of reaction products, water or other compounds that are not completely collected in the condensation vessels. The process stream, on the other hand, depending on the location within the circuit will contain at least some and possibly very large amounts of pyrolysis reaction products that will be sequentially removed by the various condensation vessels 410.

In the embodiment shown, the different recuperators may be operated at different temperatures. For example, in an embodiment the first recuperator 406a may receive the process stream of $CO_2$ and dissolved reaction products at about 550° C. and discharge it at 450° C. The second recuperator 406b may receive the 450° C. stream and discharge it at 300° C. The third recuperator 406c may receive the 300° C. stream and discharge it at 150° C. The fourth recuperator 406d may receive the 150° C. stream and outputs it at 50° C.

The return stream of $CO_2$ is partially reconditioned by a pump/compressor 420 that brings the $CO_2$ back up to operating pressure (e.g., approximately 10 MPa) and a heater 422 to provide additional heat to the $CO_2$ to bring it up to the desired pyrolysis temperature. For example, in an embodiment, the pump/compressor 420 receives $CO_2$ at about 10 MPa and compresses the stream to about 12 MPa, which provides sufficient pressure to maintain the flow through the entire $CO_2$ circuit without any additional pumps. The heater 422 may be a single heating unit or multiple units in parallel and/or in series depending on operator preference. For example, in an embodiment three, separate heaters in series are provided that receive the recuperated $CO_2$ stream from the first recuperator 406a and heat the stream from an inlet temperature of about 450° C. to about 550° C. Likewise, there may be a single pump 420 as shown, or multiple pumps distributed throughout the $CO_2$ circuit. For example, in an embodiment in which a portion of circuit is below supercritical conditions, a dedicated heater and/or compressor (not shown) may be provided purely to recondition the $CO_2$ to supercritical.

By providing multiple stages of pairs of heat exchangers 406, 408 followed by condensation vessels 410, the pyrolysis products may be fractionated and collected by condensation temperature. This allows desired specific fractions to be easily separated as part of the recuperation process. By providing more or fewer stages, greater or lesser differentiation of the fractions may be achieved, as well as controlling the makeup of each fraction.

In addition to having multiple stages of heat exchangers 406, 408 followed by condensation vessels 410, further flexibility is obtained through the use of a bypass circuit created by a number of bypass valve 412 in the output CO₂ portion of the circuit and the inlet/return CO₂ portion of the circuit. In an embodiment, one or more of the heat exchangers are equipped with bypass capability allowing that exchanger to be completely or partially bypassed by either or both of the pyrolysis output stream and the inlet/return stream. In the embodiment shown, various bypass valves 412 are provided that allow each of the different stages to be either completely or partially bypassed as desired by the operator. At any bypass valve 412, the operator may select how much of the input stream is directed to either outlet of the valve. This level of flow control provides significant flexibility in the operation of the system 400 and allows further operational control over where in the system the various fractions of the pyrolysis products are collected.

The pyrolysis system 400 may further be provided with additive injection systems for injecting additives into the CO₂ inlet/return stream prior to delivery to the pyrolysis chamber 402. In the embodiment shown, two additive injection systems are shown, each including an injection pump 414 and an additive supply 416. Examples of additives, described in greater detail above, include $H_2$, $H_2O$, formic acid, and tetralin. In an embodiment, the injection pump 414 is an HPLC injection pump.

In yet another embodiment (not shown), bypass valves 412 may be provided to allow one or more condensation vessels 410 to be bypassed. This allows collection of reaction products to be combined into fewer vessels as desired, thus further increasing the flexibility of the system 400.

A controller 430 is illustrated in FIG. 4. In an embodiment, the controller 430 is a programmable logic controller configured to monitor and control the pyrolysis system 400 to achieve desired results. Controllers may be implemented in many different manners, from purpose built hardware controllers to general purpose computing devices executing control software. Process controllers are well known in the art and any suitable controller design or combination of designs now known or later developed may be used.

The controller 430 controls the distribution of the flow of the process stream and the return stream through the various stages of recuperators. In this way, the inlet and outlet temperatures of the streams at each stage may be altered. The heat transfer equations governing the heat exchange between hot and cold streams in a heat exchanger are well known and any form of these equations may be used by the controller to determine the distribution of the flows among the stages in order to get specific temperatures at specific locations in the CO₂ circuit. For example, one basic heat exchanger equation that may be used is a general counterflow heat exchange equation describing the transfer of heat across a:

$$\dot{m}_a c_{pa}(T_{a1}-T_{a2}) = \dot{m}_b c_{pb}(T_{b2}-T_{b1})$$

where $\dot{m}_a$ is the mass flow rate of the process stream, $c_{pa}$ is the specific heat of the process stream, $T_{a1}$ is the inlet (high) temperature of the process stream entering the recuperator stage, $T_{a2}$ is the outlet (low) temperature of the process stream, $\dot{m}_b$ is the mass flow rate of the return stream, $c_{pb}$ is the specific heat of the return stream, $T_{b1}$ is the inlet (low) temperature of the return stream entering the recuperator stage, and $T_{b2}$ is the outlet (high) temperature of the return stream. From the above equation, as is known in the art, additional equations can be derived which mathematically describe the performance of the recuperator, often in terms of an overall heat transfer coefficient for the recuperator based on its dimensions and characteristics. In many cases the performance equations for a heat exchanger may be provided by the manufacturer. Such equations, as necessary, are solved by the controller to determine how to distribute the flow of the streams through the recuperator stages in order to achieve the goals set by the operator, examples of which are provided below.

In an embodiment the controller 430 is connected and capable of controlling the bypass valves 412, the heater 422, the chilled water system 424, additive pumps 414, and other components of the system 400. In addition, the controller 430 may be connected to or otherwise receive information or signals from one or more monitoring devices 426, from which the controller 430 receives data regarding the status of the system 400.

FIG. 4 illustrates several monitoring devices 426 at various locations throughout the system 400. Monitoring devices 426 may be any type of process monitor, analyzer, or sensor such as, for example, flow sensors, temperature sensors, pressure sensors, scales, pH sensors, spectrometers, photo-ionization detectors, gas chromatographs, catalytic sensors, infra-red sensors and flame ionization detectors, to name but a few. Monitoring devices 426 may be located anywhere in the system 400 as desired. For example, in an embodiment a gas chromatograph may be used to periodically or continuously monitor and determine the different compounds and their relative amounts in the reaction products in the sCO₂ leaving the reaction chamber 402. Alternatively, liquid level sensors on each condensation vessel may be provided and from there data the relative production rate of each recuperator stage's condensates may be determined.

Based on information received from the monitoring devices 426, the controller 430 may change the flow through one or more bypass valves and the temperatures of one or more streams to obtain a desired hydrocarbon condensate fraction (i.e., range of molecular weights) in one or more of the condensate vessels. For example, in an embodiment the controller may be directed to separate and recover hydrocarbons having boiling points from 300 to 350° C. In this embodiment, the flow through the various bypass valves may be adjusted so that the process stream is discharged from the first recuperator 406a at a temperature of 350° C. (as opposed to 450° C. as mentioned above) and discharged from the second recuperator 406b at a temperature of 300° C. This may be achieved by bypassing a portion of the return stream around the second recuperator 406b so that a relatively larger and cooler return stream is driven through the first recuperator 406a, increasing the relative amount of cooling performed by the first stage. In this way, reaction products with boiling points above 350° C. are collected in the condensate vessel 410 between the first recuperator 406a and the second recuperator 406b while reaction products having boiling points from 300 to 350° C. are collected in the condensate vessel 410 following the second recuperator 406b.

As can be seen by the above example, through the use of the controller 430 and flexibility achieved by the system's design, the operating configuration of the system 400 may be changed in real time to achieve different goals. In addition, by basing the control of the system 400 on real-time knowledge reported by the sensors and monitoring devices, the system 400 can adjust over time in response to changing conditions such as changing feedstock quality. In this aspect, through the controller 430 and the multiple stages of recuperators and condensation vessels, the system 400 may be easily configured to separate and collect different fractions of hydrocarbons into different condensation vessels. By providing more stages, even more differentiation may be provided as required. Because the controller 430 can easily reconfigure the bypass valves 412, the system 400 is uniquely capable of handling different output requirements or changes in feedstock characteristics.

In addition, the controller 430 may also be used to control and optimize the reaction products that are obtained from the pyrolysis reaction. For example, in an embodiment the controller 430 may directly or indirectly control the temperature and/or the pressure in the reaction chamber 402 to change the relative amounts of different reaction products. In an embodiment, changes in temperature or pressure in the reaction chamber may be done in real-time based on monitoring information received from the sensors and monitoring devices. For example, monitoring data indicative of the type and amount of different reaction products in the $sCO_2$ leaving the reaction chamber 402 may be provided to the controller 430. In response to preset goals, such to optimize a subset of reaction products (e.g., maximize production of reaction products having boiling points from 250 to 350° C.), the controller 430 may then iteratively change the temperature and/or pressure in the reaction chamber until an optimized profile of reaction products is obtained based on the current goals of the system 400.

Figure 5A:
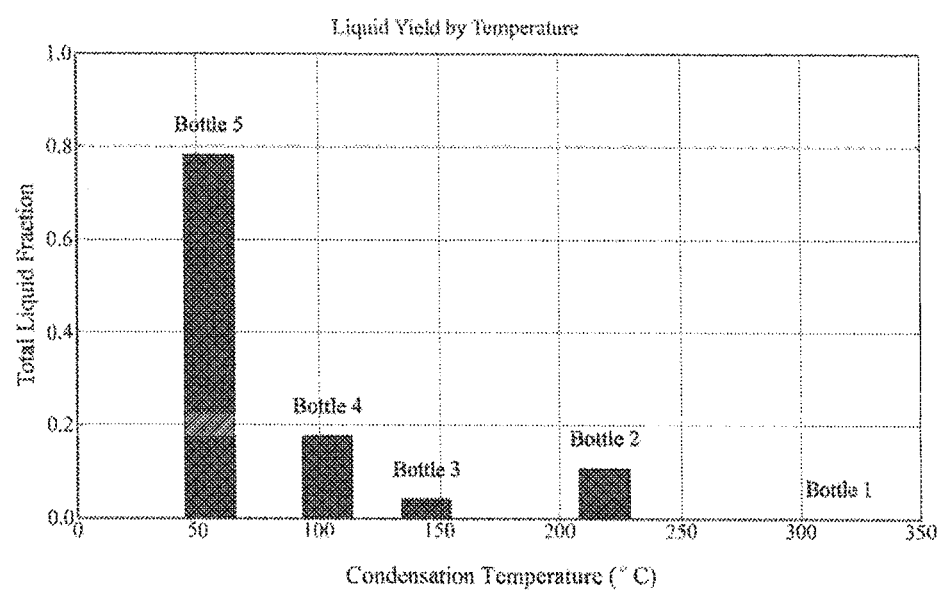
FIGS. 5A-5C illustrate the experimental performance of an embodiment of the system shown in FIG. 4.
Figure 5B:
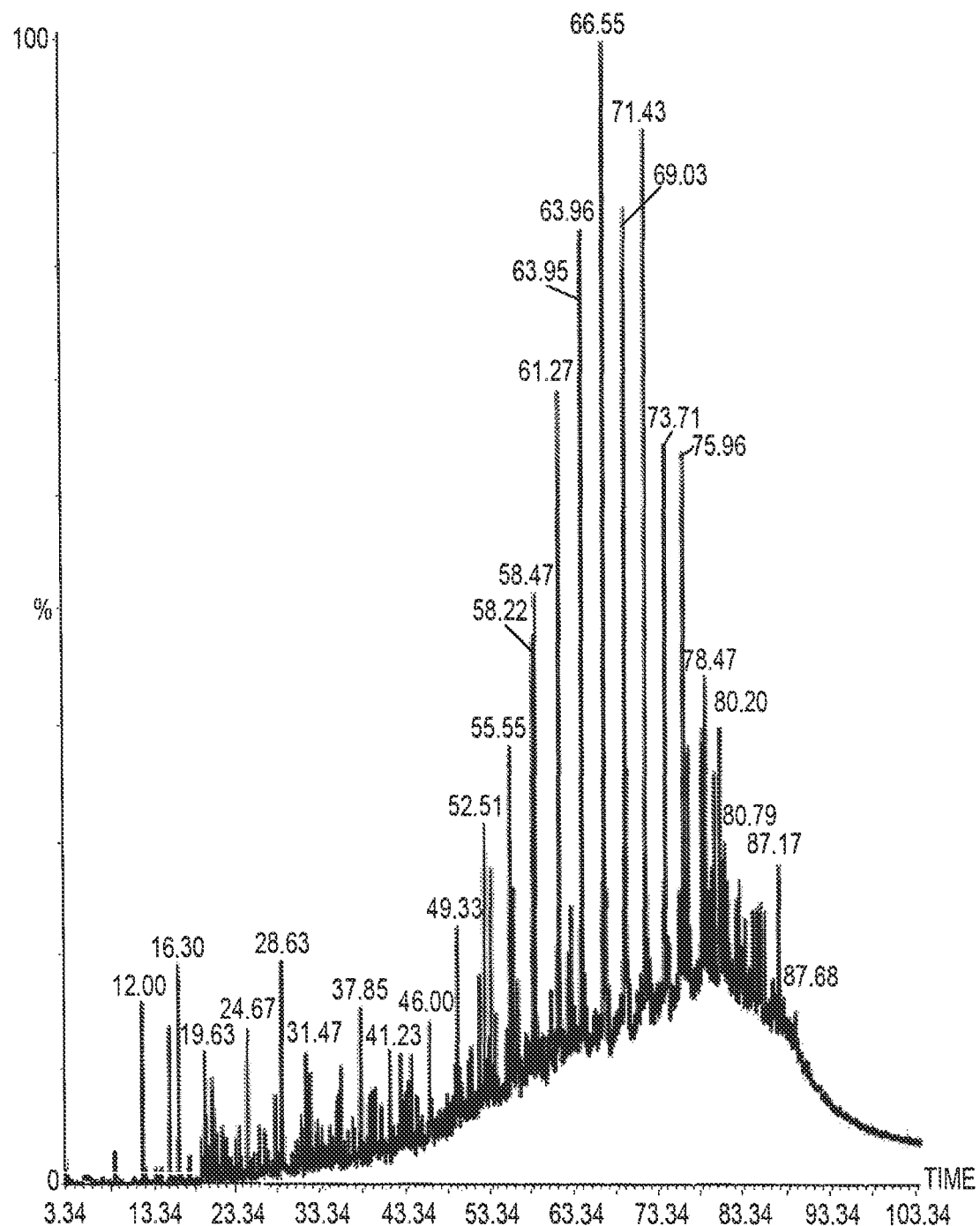
Figure 5C:
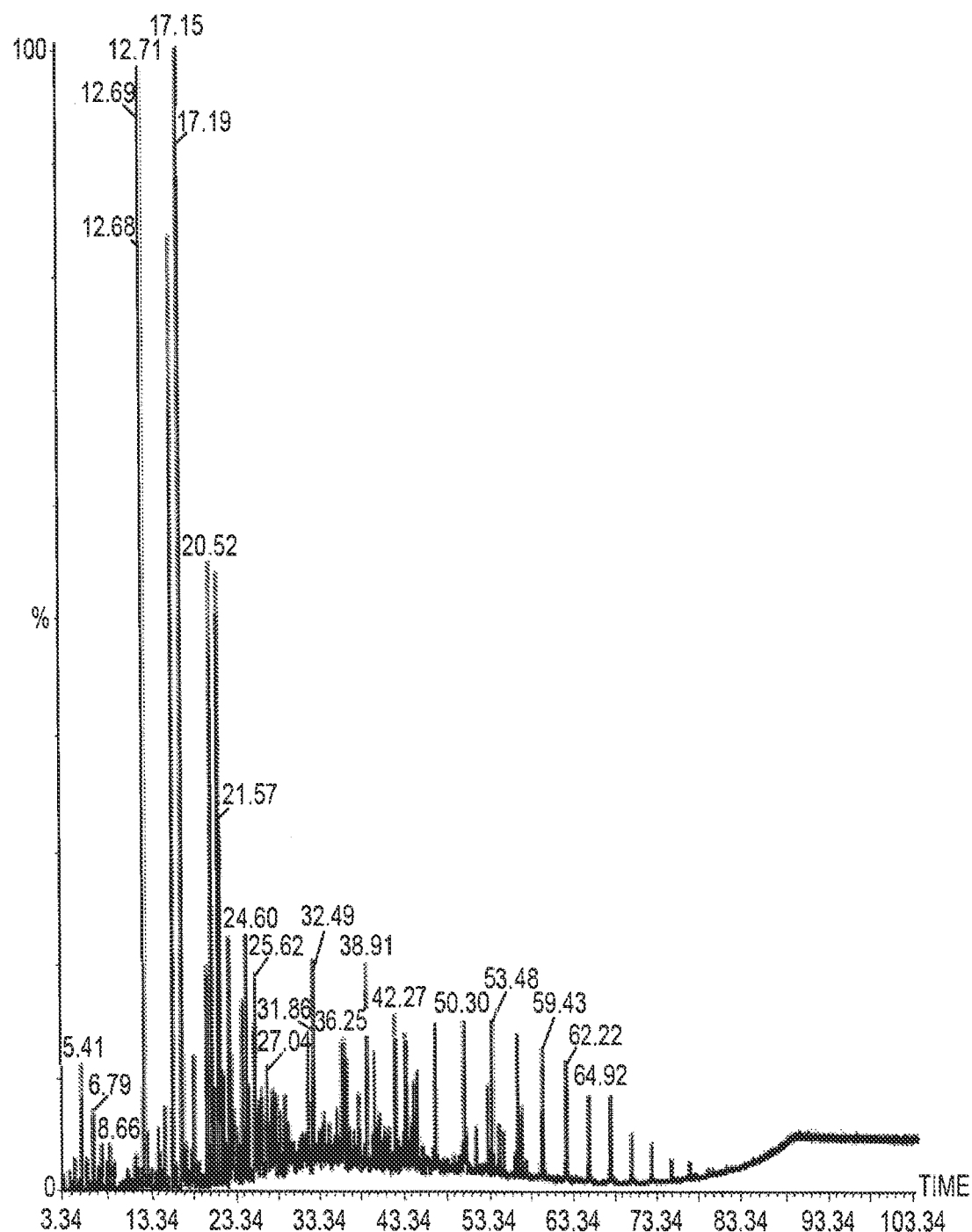

FIGS. 5A-5C illustrate the experimental performance of an embodiment of the system shown in FIG. 4. In the FIGS., the system is alternately referred to as a multistage supercritical liquefaction system. In the experiment, an embodiment of the system shown in FIG. 4 was created at a bench scale using four recuperators and a final chilled water heat exchanger as illustrated. A 1 kg sample of Power River Basin subbituminous coal was placing in a column and pyrolyzed using $sCO_2$ as described above. A fine mesh screen was provided at the bottom of the column to prevent solids from exiting from the chamber.

For startup, the bypass circuit was used to isolate the pyrolysis chamber until the system reached the desired thermal conditions. After the loop achieved test temperatures, the bypass was disabled and the pyrolysis chamber was placed in the loop. The outlet temperature of the $sCO_2$ leaving the pyrolysis chamber was approximately 490° C. and the inlet temperature of the $sCO_2$ delivered to the pyrolysis chamber was approximately 500° C. The pressure of the $sCO_2$ in the pyrolysis chamber was approximately 10 MPa and the mass flow rate of $sCO_2$ circulating through the circuit was between 4.5 and 10 kg/min during the experiment. The system was operated without bypassing any of the five heat exchangers such that the full flow of $CO_2$ passed through each exchanger/condensation vessel stage. The condenser vessels were cold fingers and designated as Bottles 1-5 maintained at the temperatures shown in FIG. 5. The system was operated for a period of time then the condensed pyrolysis products from the condensation vessels were analyzed.

FIG. 5A illustrates a representative liquid yield obtain from pyrolyzing a batch of coal by condensation vessel temperature. The condenser vessels were cold fingers and designated as Bottles 1-5 maintained at the temperatures shown in FIG. 5A.

Mass spectroscopy was performed on the condensate fractions obtain from Bottles 2 and 5. FIG. 5B shows the results for Bottle 2 and FIG. 5B shows the results for Bottle 5. As expected the results show a substantially higher molecular weight product distribution was condensed in the higher temperature Bottle 2 than was obtained in the lower temperature Bottle 5. This illustrates that the multistage separation system is successful in generating and fractionating different pyrolysis products from a carbonaceous feedstock.

Figure 6:
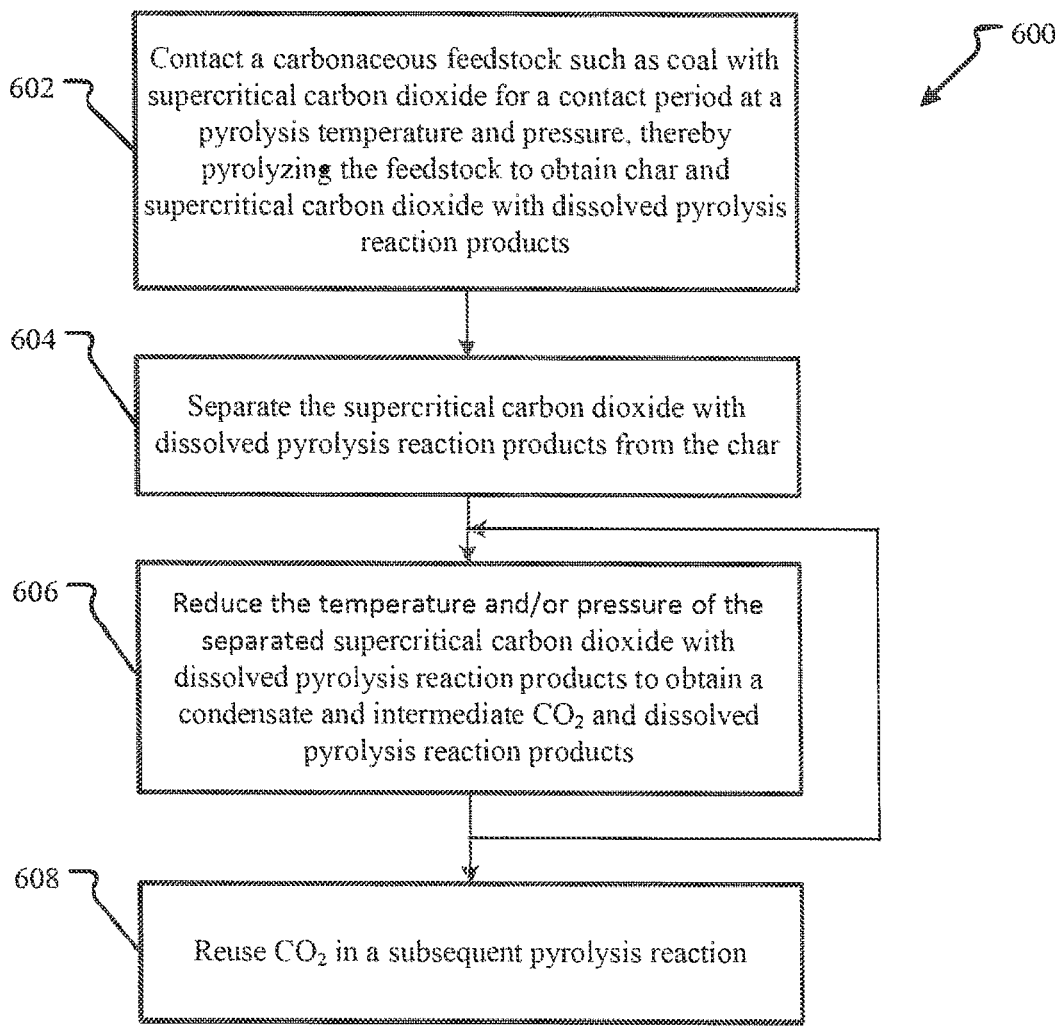
FIG. 6 illustrates an embodiment of a broad method for pyrolyzing carbonaceous feedstock to obtain reaction products using $CO_2$.

FIG. 6 illustrates an embodiment of a broad method for pyrolyzing carbonaceous feedstock to obtain reaction products using $CO_2$. The embodiment shown is discussed in terms of an ongoing process that reconditions and recycles the $CO_2$ for reuse in a closed loop. The process in FIG. 6 is illustrated as beginning with a contacting operation 602. In the contacting operation 602 a carbonaceous feedstock is maintained in contact with supercritical carbon dioxide for some contact period at a pyrolysis temperature and pressure sufficient to both maintain the $CO_2$ in a supercritical state and at which pyrolysis occurs. The resulting pyrolysis causes at least some of the feedstock to be converted into char and generates some amount of pyrolysis reaction products which are dissolved into the $CO_2$.

The contact period, or residence time, used may be selected by the operator. The contacting may be static in that the $CO_2$ is not flowing through the contacting chamber during the pyrolysis. Rather, the chamber is charged with $CO_2$ and the feedstock and then allowed to react, with or without internal agitation or other mixing. In this case, the contact time is the time that the $CO_2$ is supercritical and within the contacting chamber with the feedstock. Alternatively, the contacting may be dynamic in that the $CO_2$ is constantly flowing through the chamber containing the feedstock. In the dynamic contacting, the residence time is calculated from the flowrate of $CO_2$ and the volume of the contacting chamber.

The chemical makeup of the pyrolysis reaction products can varied to a certain extent by changing the pyrolysis conditions. For example, a relatively higher temperature and pressure used in the contacting operation 602 may favor the generation of some reaction products (e.g., heavier hydrocarbons such as oils) over others (e.g., mid-weight oils or lighter hydrocarbon gases). In addition, additives such as water, formic acid, hydrogen, or some other hydrogen donor may be used to increase the availability of hydrogen during the pyrolysis, which will also change the chemical makeup of the reaction products. Other additives may also be used to affect the pyrolysis reaction and vary the chemical makeup of the reaction products.

After the contact time, the supercritical $CO_2$, now containing dissolved pyrolysis reaction products, is separated from the char in a separation operation 604. The separation operation may take the form of removing the char from the $CO_2$ or removing the $CO_2$ from the char.

After the separation operation 604, the supercritical $CO_2$ is then cooled in a first cooling operation 606 to a first temperature and a first pressure. For example, in an embodiment the pyrolysis temperature and pressure is 540° C. and 11 MPa, respectively, and the first temperature and first pressure is 450 and 10.9 MPa. The first cooling operation 606 may include reducing the temperature or the temperature and the pressure of the $CO_2$ from the pyrolysis temperature and pressure used in the contacting operation 602. In addition, although referred to as the cooling operation 606 in an embodiment the 'cooling' may consist of only reducing the pressure of the $CO_2$ while maintaining the temperature at or close to the pyrolysis temperature. Regardless of whether the temperature, the pressure or both are reduced, the cooling operation 606 causes the solubility of the dissolved reaction products to change and any reaction products that are no longer soluble in the $CO_2$ and the first temperature and pressure will condense out of the $CO_2$ as a condensate.

As part of or after the first cooling operation 606, the condensate generated by the first cooling operation 606 may be collected and stored for later use. Contents of this condensate will be determined by the reaction products generated by the pyrolysis reaction and the first temperature and pressure of the first cooling operation 606. Thus, as described above, through selection of the first temperature and pressure, the chemical makeup of the condensate generated by the first cooling operation 606 can be controlled to obtain a specific fraction of the pyrolysis reaction products. Once the temperatures are known, in an embodiment the heat exchanger equations can be used to determine the relative flow rates of the return stream and process stream through the different recuperators necessary to achieve those temperatures and, thus, the desired condensate. From this information the controller can then set the positions of the bypass valves as necessary to obtain the determined flow rates.

The $CO_2$ with the remaining reaction products is then subjected to a second cooling operation 608. Similar to the first cooling operation 606, the second cooling operation 608 reduces the $CO_2$ from the first temperature and pressure to a second temperature and pressure. Again, this may include reducing the temperature, the pressure or both of the $CO_2$. The second cooling operation can be performed using the same equipment as the first cooling operation 606 or by passing the $CO_2$ to a second set of equipment (e.g., heat exchanger, cooling vessel, etc.) in which the second cooling operation is performed.

As part of or after the second cooling operation 608, the condensate generated by the second cooling operation 608 may be collected and stored for later use. Contents of this second condensate will be determined by the reaction products generated by the pyrolysis reaction, the first temperature and pressure used in first cooling operation 606, and the second temperature and pressure of the second cooling operation 608. Thus, as described above, through selection of the first and second temperatures and pressures, the chemical makeup of the condensate generated by the second cooling operation 606 can be controlled to obtain a specific fraction of the pyrolysis reaction products. Once the temperatures are known, in an embodiment the heat exchanger equations can be used to determine the relative flow rates of the return stream and process stream through the different recuperators necessary to achieve those temperatures and, thus, the desired condensate. From this information the controller can then set the positions of the bypass valves as necessary to obtain the determined flow rates.

Additional cooling operations (not shown) can be performed. By using additional cooling operations the fractionation and collection of the reaction products can be tightly controlled. For example, 25 cooling operations can be used to obtain very finely fractionated condensates. Any number of cooling operations may be used as desired depending on the operator's goals. With reference to FIG. 4 that shows a system with a potential of five cooling operations, the chemical makeup of the condensates of each of the five stages can be varied by changing the relative temperatures and pressures of the operations. For example, in one configuration, the first four cooling operations may be done with very narrow temperature and/or pressure differences—e.g., the first temperature may be 10° C. less than the pyrolysis temperature, the second temperature 20° C. less, the third 30° C. less and the fourth 40° C. less, while the last temperature may be 30° C., a configuration that would fractionating higher temperature reaction products (that is, reaction products that condense out of the $CO_2$ at a higher temperature). In another configuration, the temperature differences may be more even between stages and in yet another configuration the temperatures may be focused to fractionate lower temperature products. Thus, as part of this method, the temperatures and pressures of the different cooling operations may be controlled to obtain specific desired fractions of the reaction products.

Finally the $CO_2$ is recycled and reused for additional pyrolysis is a reuse operation 610. The reuse may be done in a continuous system in which the $CO_2$ is continuously flowing in a loop such as that shown in FIG. 4. Alternatively, the $CO_2$ may be stored for reuse later in a batch or semi-batch system.

As part of the method 600, the $CO_2$ may be maintained in the supercritical state throughout the entire method. Alternatively, the $CO_2$ may be taken to a subcritical state, for example in a final cooling operation, in order to condense and remove as much of the reaction products as possible, before the $CO_2$ is returned to the supercritical state in the reuse operation 610.

Figure 7:
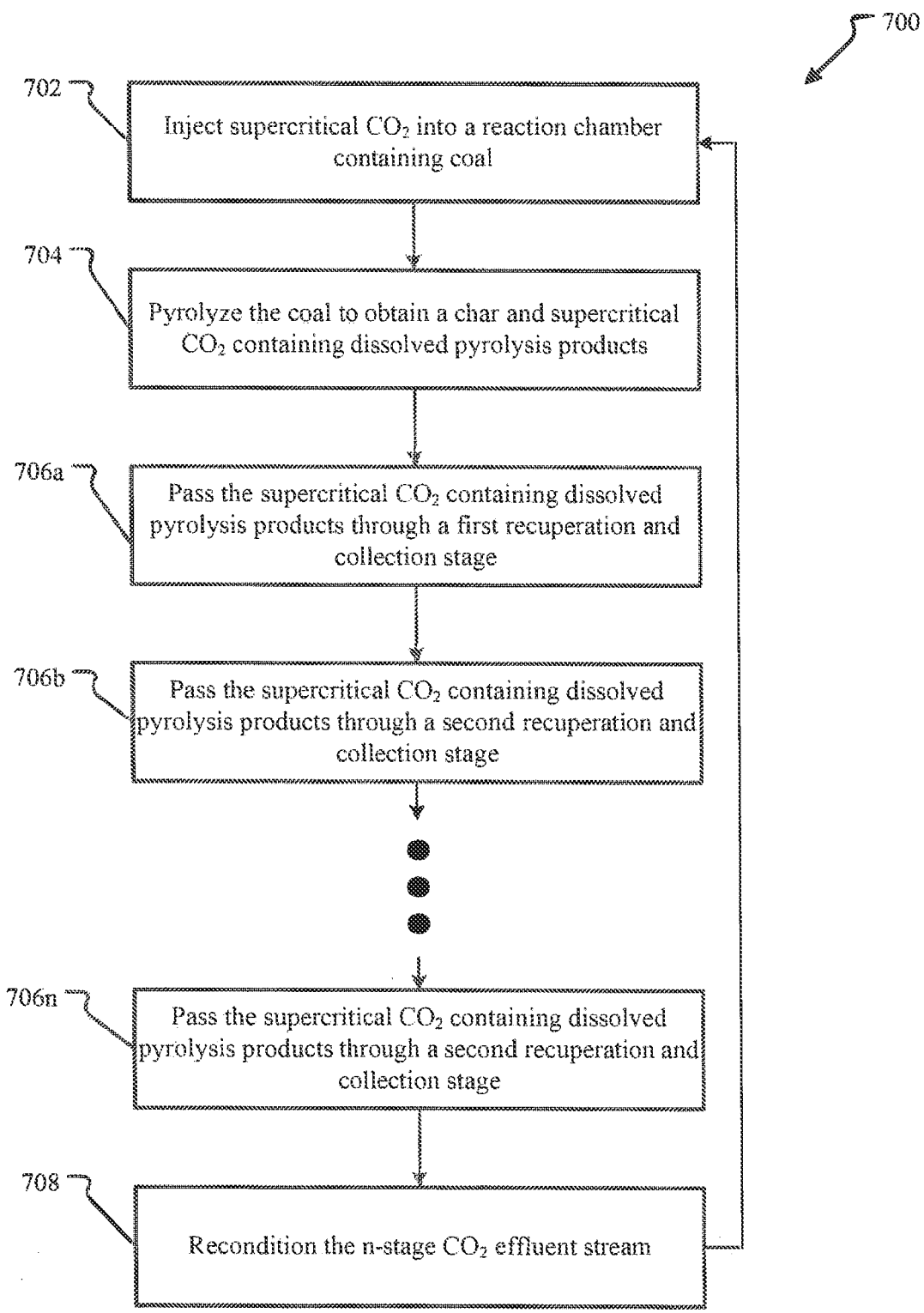
FIG. 7 is a more detailed embodiment of a method for pyrolyzing coal with supercritical $CO_2$.

FIG. 7 is a more detailed embodiment of a method for pyrolyzing coal with supercritical $CO_2$. While the method 600 of FIG. 6 is more broadly written to cover any batch, semi-batch or continuous pyrolysis process, the method 700 of FIG. 7 is more specific to a continuous pyrolysis process that fractionates pyrolysis products from coal and recycles the $CO_2$ in a continuously flowing loop.

In the embodiment shown in FIG. 7, the method 700 begins with flowing an inlet stream of carbon dioxide ($CO_2$) into a reaction chamber containing coal in a supercritical $CO_2$ injection operation 702. In an embodiment, the inlet $CO_2$ stream's temperature is from 300-600° C. and pressure is from 7-12 MPa.

The reaction chamber is maintained at a pyrolysis temperature and pressure sufficient to maintain the $CO_2$ in the reaction chamber in a supercritical state. This is illustrated in FIG. 7 by the pyrolysis operation 704. The pyrolysis operation 704 may include actively controlling the temperature and pressure of the reaction chamber. For example, an internal or external heater may be used to add heat directly to the reaction chamber to control its temperature. Likewise, the pressure may be controlled by adjusting the flow rate of the inlet and outlet $CO_2$ streams. Alternatively, the temperature and pressure of the reaction chamber may be indirectly controlled solely by controlling the temperature and flow rate of the inlet stream. Thus, the coal is pyrolyzed to obtain a char and supercritical $CO_2$ containing dissolved pyrolysis products in the pyrolysis operation 704. As discussed above with reference to FIG. 6, the chemical makeup of the reaction products may be controlled to an extent by changing the temperature and pressure in the reaction chamber and also through the use of certain additives.

After a contact period determined by the $CO_2$ flow rate through the reaction chamber and the volume of $CO_2$ in the chamber, the supercritical $CO_2$ containing dissolved pyrolysis products then flows as a reactor outlet stream from the reaction chamber via an outlet in an outlet stream discharge operation 706.

The outlet stream is then passed to first recuperator in a first recuperation and collection operation 706a. In this operation 706a, the reactor outlet stream is cooled in the first recuperator by transferring heat to a return stream of $CO_2$ on its way back to the reaction chamber. The outlet stream is cooled to a first temperature less than the pyrolysis reaction temperature based on the temperatures and flow rates of the two $CO_2$ streams, i.e., the outlet stream and the return stream, passing through the first recuperator.

The act of cooling the outlet stream causes the dissolved reaction products which condense at temperatures greater than the first temperature, if any, in the outlet stream to condense out of the $CO_2$. The first recuperation and collection operation 706a includes collecting this first stage condensate in a collector such as a collection vessel as shown in FIG. 4. It also includes discharging a first stage $CO_2$ effluent stream that contains any dissolved reaction products not removed as a first stage condensate.

It should be pointed out that not all of the outlet stream may be treated in the first recuperation and collection operation 706a. In an embodiment some portion of the outlet stream may be sent to a later stage recuperator and treated in a later recuperation and collection operation. This diversion of some of the outlet stream may be done to control the chemical makeup of the condensates obtained from the different stages.

The first stage $CO_2$ effluent stream is then passed to second recuperator in a second recuperation and collection operation 706b. In this operation 706b, the reactor first stage $CO_2$ effluent stream is cooled in the second recuperator by transferring heat to the return stream of $CO_2$ on its way back to the reaction chamber. The first stage $CO_2$ effluent stream is cooled to a second temperature less than the first temperature based on the temperatures and flow rates of the two $CO_2$ streams, i.e., the first stage $CO_2$ effluent stream and the return stream, passing through the second recuperator.

Again, the act of cooling the outlet stream causes those dissolved reaction products remaining in the first stage $CO_2$ effluent stream which condense at temperatures higher than the second temperature, if any, to condense out of the $CO_2$. The second recuperation and collection operation 706b includes collecting this second stage condensate in a collector such as a collection vessel as shown in FIG. 4. It also includes discharging a second stage $CO_2$ effluent stream that contains any remaining dissolved reaction products not removed as a second stage condensate.

Again, not all of the first stage $CO_2$ effluent stream need be passed to the second recuperator and some portion of the first stage $CO_2$ effluent stream may be diverted to a later recuperation and collection operation in order to change the chemical makeup of later stage condensates.

Any number of additional recuperation and collection operations may be performed in the method 700. This is illustrated in FIG. 7 by the ellipsis and the n-stage recuperation and collection operation 706n. Each of the recuperation and collection operations 706a-n may be identical except for the operational temperature and pressures of the two $CO_2$ streams involved. The condensates recovered from each of the operations 706a-n may be controlled by diverting portions of the process stream and/or return stream around and to various operations 706a-n to obtain desired condensates. The distribution of flow through the different recuperation and collection operation 706a-n may be manually controlled or automatically controlled by a controller in order to collect different fractions at different stages as described above.

Note that one or more of the operations 706a-n, such as for example the final recuperation and collection operation 706n as in FIG. 4, may not include recuperating heat from the process stream. That is, rather than passing heat to the return stream of $CO_2$ and effectively recycling that energy, the heat may simply be removed, such as by transferring it to a cold water stream, and either discarded or recycled for another purpose.

In addition, not all of the recuperation and collection operations 706a-n need include the collection of a condensate in a separate vessel. Rather, some condensates could be directed into the following stage recuperators for later collection in a downstream recuperation and collection operation.

After the last recuperation and collection operations 706n, the final stage $CO_2$ effluent steam is then reconditioned by passing it as the return stream through the various recuperation stages in a reconditioning operation 708. The reconditioning operation 708 may include compressing the return stream and/or heating the return stream at one or more points in the system's $CO_2$ return circuit. For example, in FIG. 4 the return stream is compressed by the pump 420 right after the fifth recuperation and collection operation (in that case not a true recuperation as the heat is removed using a cold water stream) and heated by heater 422 just prior to being injected into the reaction chamber 402.

Note that the reconditioning operation 708 may or may not clean any remaining reaction products from the $CO_2$. In an embodiment, some trace amounts of reaction products and/or other compounds such as water remain in the $CO_2$ return stream when it is injected into the reaction chamber.

After reconditioning, the $CO_2$ return stream is then injected into the reaction chamber as the inlet stream in the injection operation 402. This is illustrated in FIG. 7 by the return arrow from the reconditioning operation 708 to the injection operation 702.

Figure 8:
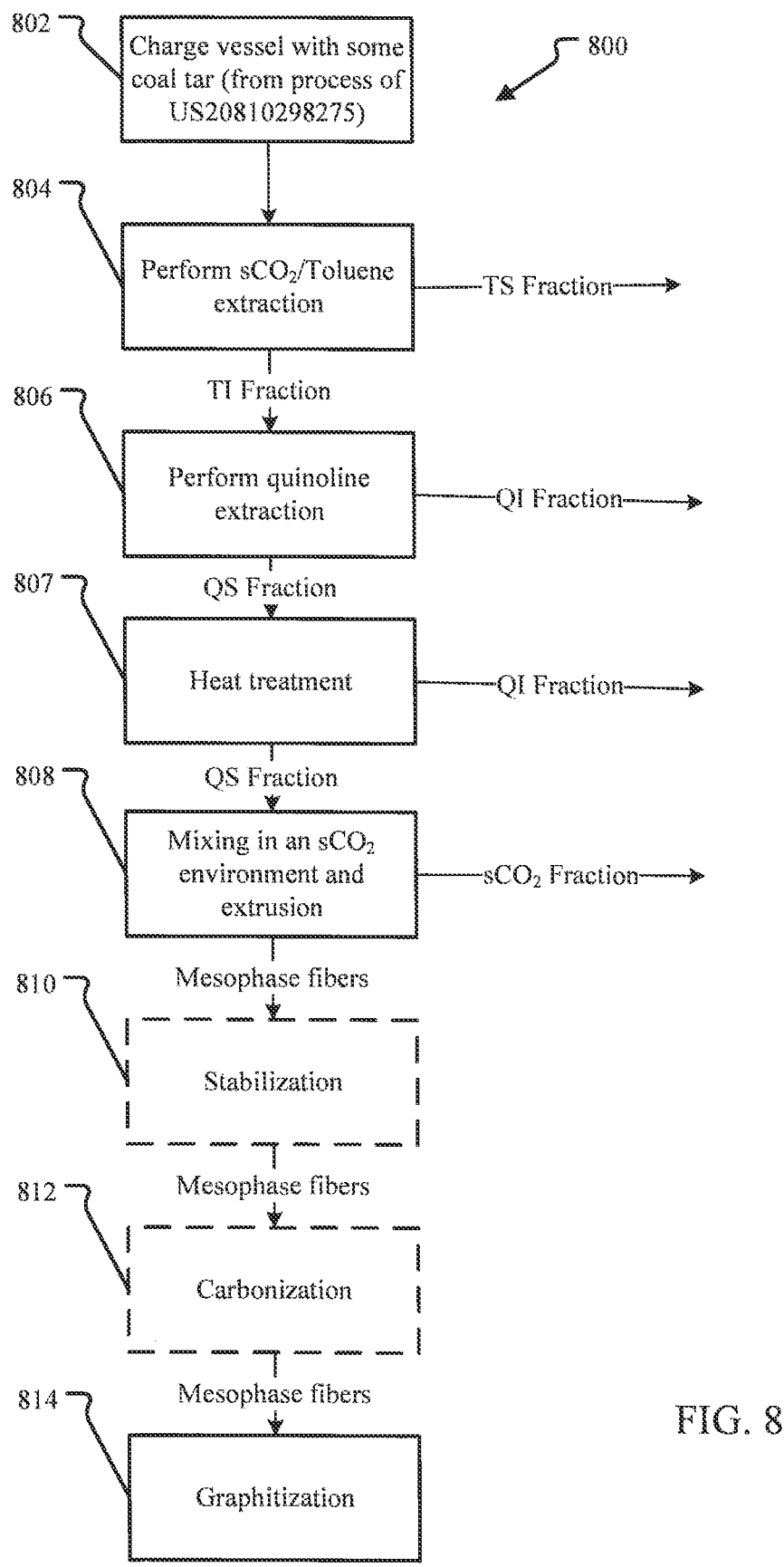
FIG. 8 illustrates an embodiment of a method for improving mesophase pitch for carbon fiber production using supercritical carbon dioxide.

FIG. 8 illustrates an embodiment of a method for improving mesophase pitch for carbon fiber production using supercritical carbon dioxide. The method uses as a feedstock some or all of a coal tar product having at least some mesophase pitch, including those discussed above. In an alternative embodiment, any feedstock having at least some mesophase pitch, whether derived from coal, any other biomass, or a hydrocarbon material, may be used as the feedstock. For the remainder of this description, 'coal tar' is the material/oils that come from pyrolysis or coking of coal. Material extracted from the coal tar is referred to as 'coal tar pitch'.

In general, the following method 800 improves the quality of the coal tar product by isolating and recovering a high molecular weight (MW) coal tar, for example, from the system 400 as shown in FIG. 4 above by contacting the feedstock with a mixture of a supercritical fluid solvent and a co-solvent. By high molecular weight it is meant a compounds having a molecular weight of 1,000 amu or more. High MW hydrocarbons of coal tar are a mesophase precursor material. While the supercritical fluid may be any supercritical fluid as described above, and the co-solvent may be any co-solvent (such as, for example, benzene, xylene, tetralin, tetrahydrofuran, pyridine, quinolone, pyridine, quinolone, and the like) or mixtures of co-solvents, the rest of this description will discuss the specific embodiment of a supercritical carbon dioxide ($sCO_2$)/toluene solvent/co-solvent combination. One of skill in the art will recognize that this disclosure is not limited to the specific embodiment described below.

The method 800 begins (operation 802) with placing feedstock coal tar in a reactor vessel, such as vessel 404 above. In an embodiment any particular fraction, or combination of fractions, of coal tar may be used as the initial feedstock. For example, in an embodiment all of the coal tar produced by the system 400 of the published application may be used. Alternatively, all of the coal tar that condenses out above some threshold temperature may be used. For example, all coal tar that condenses out at or above 50° C., 100° C., 150° C., or 200° C. may be used. Alternatively, coal tar that condenses out between some defined range of temperatures may be used.

The reactor vessel is then raised to operational temperature and pressure (as described above) and the $sCO_2$/toluene solvent is passed through the reactor vessel 404 and condensation circuit in a $sCO_2$/toluene extraction operation 804. The toluene soluble (TS) fraction is collected and recovered from the flowing $sCO_2$/toluene solvent leaving the reaction vessel by the condensation circuit. The flow is maintained for some period of time such as, for example, one minute, one hour, two hours, four hours, ten hours, 24 hours, etc. selected by the operator. The time period may be fixed or may be determined based on the amount of TS fraction material recovered over time. For example, when the amount TS fraction material per minute falls below a threshold, the extraction may be considered to be completed. After this time period, the flow is terminated and the reactor conditions are reduced to below supercritical conditions.

Optionally, the material remaining in the reaction vessel may then be washed with toluene as final step in the operation 804. Alternatively, a solvent other than toluene or a combination of multiple solvents (e.g., toluene and xylene) after the temperature and pressure conditions have been reduced to below supercritical conditions.

After the $sCO_2$/toluene extraction operation 804, the toluene insoluble (TI) fraction remaining in the reaction vessel may be washed with quinoline in a quinoline soluble fraction extraction operation 806. In an alternative embodiment, the extraction operation 806 may be done in a different reaction vessel necessitating a transfer operation between vessels.

In one embodiment of this operation 806, quinoline is added to the material remaining in the vessel and held at some temperature and pressure for some period of time. In an alternative embodiment, quinoline is circulated through the reaction vessel held at some temperature and pressure for some period of time. After the desired period of time, for any period of time, for example, less than or up to one minute, one hour, two hours, four hours, ten hours, 24 hours, etc., the quinoline is removed thereby removing any quinoline-soluble (QS) material leaving the quinoline insoluble (QI) material behind in the reaction vessel.

The quinoline along with any dissolved QS components are then distilled, for example using rotary evaporation, in a distillation operation to separate the quinoline from the QS compounds. The QS compounds recovered from the distillation of the quinoline, referred to herein as the QS fraction, represent an improved coal tar product suitable for the production of anisotropic mesophase pitch suitable for carbon fiber formation/spinning.

After distillation, the QS fraction is heat treated to make mesophase pitch before adding to an extruder. This heat treatment operation 807 generates mesophase structure or increases the amount mesophase material if mesophase material is already present. In an embodiment, the heat treatment operation 807 may be performed under vacuum, atmospheric, or pressurized condition (e.g., from 1.01 atm to 500 atm) and includes heating the QS fraction to from 300 to 400° C. and holding it at that temperature for some period of time sufficient to generate mesophase structure. For example, in one embodiment, temperature-controlled $sCO_2$ may be used to heat the QS fraction in a reactor vessel. Through this step, a mesophase structure (70-100%) is produced. The operation 807 may also create some additional quinoline insoluble (QI) material which may be separated from the QS fraction as shown before the next operation. This may be done by performing a second extraction operation 806.

In an alternative embodiment, the heat treatment operation 807 may heat the QS fraction to any temperature from 200 to 800° C. for any period of time, for example, less than or up to one minute, one hour, two hours, four hours, ten hours, 24 hours, etc., selected by the operator. The time period may be fixed or may be determined based on the amount of mesophase generation.

The QS fraction is then thoroughly mixed and extruded under fixed conditions in a compounding operation 808. This may be done using any commercial compounder or extruder such as, for example, a HAAKE™ MiniLab 3 Micro Compounder or a Pharma 11 Twin-screw extruder (both by Thermo Scientific®). In this operation, the QS fraction is thoroughly mixed under supercritical conditions in a $sCO_2$ environment for a desired amount of time. After the desired amount of mixing, the QS fraction and $sCO_2$ mixture is extruded. As the material leaves the compounder/extruder, at temperature, the $sCO_2$ solvent evaporates out of the mixture carrying away any compounds solubilized into the $sCO_2$ leaving fibers of the mesophase pitch. It is believed that the remaining extruded material will be mostly if not entirely mesophase pitch and for this reason it is referred to as the mesophase fraction. Without being bound to any particular theory, it is also believed that the extrusion at temperature with the $sCO_2$ may potentially serve as both oxidizer and catalyst to residual unwanted light MW compounds (representing impurities in the mesophase pitch solution) that can ultimately form coke or poor crystallization upon graphitization resulting in poor carbon fiber quality.

In the compounding operation 808 described above, the mixing and extrusion are performed at the same time as a combined process. In an alternative embodiment, the mixing and extrusion could be treated as separate operations. In this embodiment, the mixing is performed under supercritical conditions and in a $sCO_2$ environment for such time as necessary to consider the QS fraction fully mixed. After it is fully mixed, the QS fraction and $sCO_2$ is then passed through an extruder which causes the $sCO_2$ to separate from the mesophase fraction and create fibers of mesophase fraction. The pressure, partial pressure, concentration of the $sCO_2$ may be adjusted prior to extrusion. The separated $sCO_2$, which will likely contain at least some dissolved low MW compounds, is removed as a $sCO_2$ fraction.

In yet another embodiment, the extrusion process may be performed with some amount of $CO_2$ solvent and co-solvent (e.g. quinolone or toluene) from the $sCO_2$/toluene extraction operation 804 with the mesophase fraction. The mesophase fraction may then be melt spun or otherwise extruded directly into fibers as is known in the art.

In yet another embodiment, the extrusion process may be replaced by a simple separation process in which the $sCO_2$ fraction is separated from the mesophase fraction. After this separation, the mesophase fraction may then be melt spun or otherwise extruded directly into fibers as is known in the art. Alternatively, the mesophase fraction may be sold as is or used for other purposes than making fibers.

The fibers of mesophase fraction may be further stabilized in an optional stabilization operation 810. Current stabilization practices extrude and pull the fiber through a series of medium (~200-300° C.) temperature oxidation ovens. One purpose of conventional stabilization is to oxidatively remove residual light MW materials prior to graphitization. Because the prior operations in the method 800, particularly the $sCO_2$/toluene extraction operation 804 and the compounding operation 808, are anticipated to remove many, if not most or all, of the lower molecular weight compounds, the sCO$_2$ process described above may remove the need for a stabilization operation 810 altogether or, alternatively, reduce the amount of time necessary for sufficient stabilization.

After stabilization, an optional carbonization operation 812, as is known in the art, may be performed. Carbonization is the process removing all nonorganic elements by heating the fibers in an oxygen-free environment and creates a crystalline carbon structure in the fibers. Due to the earlier extractions, it may be that the mesophase fraction will be sufficiently devoid of nonorganic elements to eliminate the need for a carbonization operation, or may reduce the time necessary for the carbonization to be performed.

A graphitization operation 814 may then be performed on the mesophase fraction as is known in the art as the final step in creating the carbon fiber. Graphitization involves treating the fibers at high temperatures to improve the alignment and orientation of the crystalline regions along the fiber direction. Having the crystalline regions aligned, stacked, and oriented along the fiber direction increases the overall strength of the carbon fiber.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained.

Notwithstanding that the numerical ranges and parameters setting forth the broad scope of the technology are approximations, the numerical values set forth in the specific examples are reported as precisely as possible. Any numerical value, however, inherently contain certain errors necessarily resulting from the standard deviation found in their respective testing measurements.

It will be clear that the systems and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. For example, in an embodiment the quinoline extraction operation 806 may be omitted and the TI fraction sent directly to the heat treatment operation 807. Numerous other changes may be made which will readily suggest themselves to those skilled in the art and which are encompassed in the spirit of the disclosure.

What is claimed:

1. A method of manufacturing carbon fibers comprising:
   contacting a coal derivative with a supercritical fluid solvent and first co-solvent mixture, thereby removing at least some soluble components from the coal derivative to obtain an insoluble coal derivative fraction;
   after contacting the coal derivative with the supercritical fluid solvent and the first co-solvent mixture, separating the supercritical fluid solvent and first co-solvent mixture from the insoluble coal derivative fraction;
   after separating the supercritical fluid solvent and first co-solvent mixture from the insoluble coal derivative fraction, mixing the insoluble coal derivative fraction with a supercritical fluid to obtain a supercritical fluid/insoluble fraction mixture; and
   after mixing the insoluble coal derivative fraction with the supercritical fluid, separating the supercritical fluid from the insoluble fraction to obtain the carbon fibers.

2. The method of claim 1, wherein the coal derivative comprises coal tar.

3. The method of claim 1, wherein:
   the coal derivative comprises a mesophase pitch precursor; and
   the carbon fibers comprise fibers of mesophase pitch.

4. The method of claim 1, wherein the supercritical fluid comprises sCO$_2$.

5. The method of claim 1, wherein separating the supercritical fluid from the insoluble fraction comprises passing the supercritical fluid/insoluble fraction mixture through an extruder.

6. The method of claim 1, further comprising:
   washing the insoluble coal derivative fraction with a second co-solvent to obtain a second co-solvent and second co-solvent-soluble fraction mixture and a second co-solvent-insoluble fraction of the first insoluble fraction;
   separating the second co-solvent from the second co-solvent-soluble fraction of the insoluble fraction; and
   mixing the second co-solvent-soluble fraction of the insoluble fraction with the supercritical fluid to obtain the supercritical fluid/insoluble fraction mixture.

7. The method of claim 6, wherein the second co-solvent comprises one or more of benzene, xylene, tetralin, tetrahydrofuran, pyridine, and quinoline.

8. The method of claim 6, further comprising:
   heating the second co-solvent-soluble fraction of the insoluble fraction to a temperature in a range of 300 to 400° C. for less than 24 hours before mixing the second co-solvent-soluble fraction with the supercritical fluid; and
   contacting the second co-solvent-soluble fraction with the supercritical fluid heated to a temperature between 300 to 400° C. for up to 24 hours.

9. The method of claim 1, further comprising performing one of:
   a stabilization operation on the carbon fibers;
   a carbonization operation on the carbon fibers; and
   a graphitization operation on the carbon fibers.

10. The method of claim 6, wherein at least one of the first co-solvent and the second co-solvent comprises an aromatic organic solvent.

11. The method of claim 6, wherein at least one of the first co-solvent and the second co-solvent comprises one or more of benzene, xylene, tetralin, tetrahydrofuran, pyridine, and quinoline.

12. The method of claim 1, wherein the supercritical fluid solvent comprises one or more of carbon dioxide, water, methane, nitrous oxide, ethane, propane, ethylene, propylene, methanol, ethanol, and acetone.

13. The method of claim 1, wherein the coal derivative is created by:
   pyrolyzing a combination of carbonaceous feedstock at a first temperature and first pressure and for a first period of time to generate $C_1$-$C_4$ gases;
   increasing the combination to a second temperature greater than the first temperature;

pyrolyzing the combination at the second temperature and for a second period of time to generate coal derivative; and extracting coal derivative from the combination.

14. The method of claim 13, wherein:
the first temperature is in a range of 150 to 350° C.;
the second temperature is in a range of 350 to 550° C.; and
the first pressure is in a range of 7 to 30 MPa.

15. The method of claim 13, wherein the first period is in a range of 1 to 120 minutes.

16. The method of claim 13, wherein the second period of time is in a range of 1 minute to 24 hours.

17. The method of claim 13, wherein pyrolyzing the carbonaceous feedstock at the first temperature and first pressure is performed in a first pyrolysis reaction chamber.

18. The method of claim 13, wherein pyrolyzing the carbonaceous feedstock at the first temperature and first pressure is performed in a carbon dioxide atmosphere.

19. The method of claim 13, wherein extracting the coal derivative includes transferring the carbon dioxide atmosphere to a separation system.

20. The method of claim 13, wherein extracting the coal derivative includes lowering at least one of the temperature or the pressure of the carbon dioxide atmosphere.

* * * * *